US012756222B2

(12) United States Patent
Toki et al.

(10) Patent No.: US 12,756,222 B2
(45) Date of Patent: Oct. 6, 2026

(54) CHARGING CONTROL METHOD AND CHARGING CONTROL SYSTEM

(71) Applicant: Nissan Motor Co., Ltd., Yokohama (JP)

(72) Inventors: Yoshimasa Toki, Kanagawa (JP); Xubin Zhou, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 698 days.

(21) Appl. No.: 18/268,525

(22) PCT Filed: Dec. 21, 2020

(86) PCT No.: PCT/JP2020/047776
§ 371 (c)(1),
(2) Date: Jun. 20, 2023

(87) PCT Pub. No.: WO2022/137306
PCT Pub. Date: Jun. 30, 2022

(65) Prior Publication Data
US 2024/0039322 A1 Feb. 1, 2024

(51) Int. Cl.

| | |
|---|---|
| ***H02J 7/04*** | (2006.01) |
| ***H01M 10/44*** | (2006.01) |
| ***H01M 10/48*** | (2006.01) |
| ***H01M 10/613*** | (2014.01) |
| ***H01M 10/625*** | (2014.01) |
| ***H01M 10/63*** | (2014.01) |
| ***H02J 7/40*** | (2026.01) |
| ***H02J 7/90*** | (2026.01) |
| *B60L 53/62* | (2019.01) |

(52) U.S. Cl.
CPC ........... *H02J 7/977* (2026.01); *H01M 10/443* (2013.01); *H01M 10/486* (2013.01); *H01M 10/613* (2015.04); *H01M 10/625* (2015.04); *H01M 10/63* (2015.04); *H02J 7/40* (2026.01); *B60L 53/62* (2019.02)

(58) Field of Classification Search
None
See application file for complete search history.

(56) References Cited

U.S. PATENT DOCUMENTS

2001/0005127 A1 6/2001 Takano et al.
2003/0169001 A1 9/2003 Murakami et al.
2006/0152196 A1 7/2006 Matsumoto et al.
2013/0197745 A1* 8/2013 Skelton ............... G01M 17/007 701/34.4

(Continued)

FOREIGN PATENT DOCUMENTS

| | | | |
|---|---|---|---|
| EP | 3247016 | A1 | 11/2017 |
| JP | H09-019074 | A | 1/1997 |

(Continued)

*Primary Examiner* — Arun C Williams
(74) *Attorney, Agent, or Firm* — Young Basile Hanlon & MacFarlane, P.C.

(57) ABSTRACT

A charging control method for controlling charging of a secondary battery includes: an acquisition step of acquiring information on heat of the secondary battery; and a control step of setting, based on the information on the heat of the secondary battery, a charging current value of the secondary battery to control an amount of heat generation by the secondary battery to a predetermined value.

7 Claims, 16 Drawing Sheets

(56) References Cited

U.S. PATENT DOCUMENTS

| | | | |
|---|---|---|---|
| 2014/0339891 | A1 | 11/2014 | Ohkawa et al. |
| 2021/0273270 | A1 | 9/2021 | Fujikawa et al. |

FOREIGN PATENT DOCUMENTS

| | | | |
|---|---|---|---|
| JP | 2002-343449 | A | 11/2002 |
| JP | 2003-087901 | A | 3/2003 |
| JP | 2005276733 | A | 10/2005 |
| JP | 2006-197727 | A | 7/2006 |
| JP | 2009-207312 | A | 9/2009 |
| JP | 4595829 | B2 | 12/2010 |
| JP | 2011-259672 | A | 12/2011 |
| JP | 2013-031303 | A | 2/2013 |
| WO | 2016/113925 | A1 | 7/2016 |
| WO | 2019244489 | A1 | 12/2019 |

* cited by examiner

| BATTERY TEMPERATURE (°C) | MAXIMUM CURRENT (A) |
|---|---|
| BT1 | MC1 |
| BT2 | MC2 |
| BT3 | MC3 |
| BT4 | MC4 |
| BT5 | MC5 |
| BT6 | MC6 |
| BT7 | MC7 |
| BT8 | MC8 |
| BT9 | MC9 |
| BT10 | MC10 |
| BT11 | MC11 |
| BT12 | MC12 |
| BT13 | 0 |

CHARGING CONTROL METHOD AND CHARGING CONTROL SYSTEM

TECHNICAL FIELD

The present invention relates to a charging control method and a charging control system that control charging of a secondary battery.

BACKGROUND ART

According to the related art, there is a technique of controlling charging of a secondary battery such as a lithium ion battery when the secondary battery is charged. For example, JP2006-197727A discloses a technique of determining a current value for charging a secondary battery based on a remaining capacity of the secondary battery.

SUMMARY OF INVENTION

According to the above technique in the related art, the secondary battery is charged by the current value determined based on the remaining capacity of the secondary battery. Here, an amount of heat generation by the secondary battery is determined based on a current and an internal resistance. Therefore, in order to continuously execute the charging, it is important to set an appropriate charging current value in consideration of the amount of heat generation, and to limit an increase in a temperature of the secondary battery during charging.

An object of the present invention is to continue charging a secondary battery while limiting an increase in a temperature of the secondary battery.

As aspect of the invention is a charging control method for controlling charging of a secondary battery. The method includes: an acquisition step of acquiring information on heat of the secondary battery; and a control step of setting, based on the information on the heat of the secondary battery, a charging current value of the secondary battery to control an amount of heat generation by the secondary battery to a predetermined value.

DESCRIPTION OF EMBODIMENTS

Hereinafter, an embodiment of the present invention will be described with reference to the accompanying drawings.

[Configuration Example of Control System for Secondary Battery]

Figure 1:
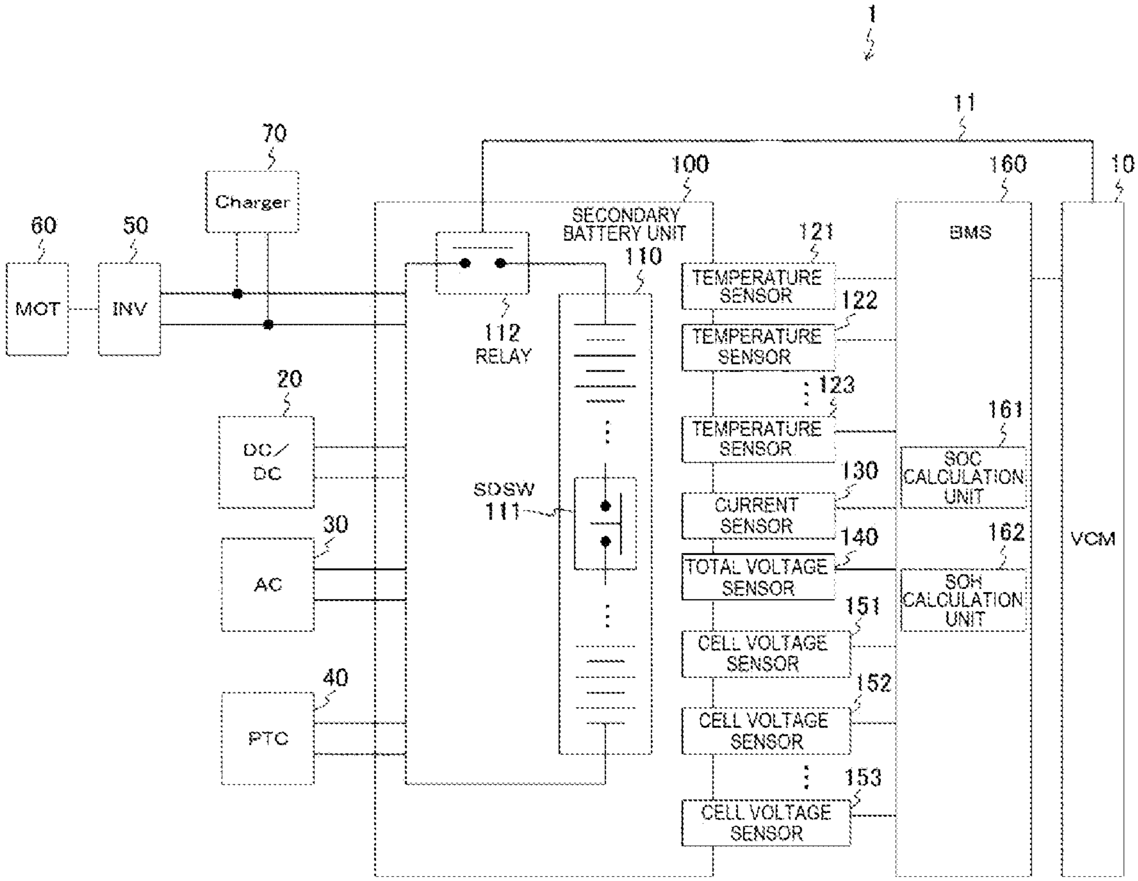
FIG. 1 is a block diagram illustrating a configuration example of a control system for secondary battery according to an embodiment.

FIG. 1 is a block diagram illustrating a configuration example of a control system for secondary battery 1 according to an embodiment. The control system for secondary battery 1 is a system that controls charging and discharging of a secondary battery mounted on a vehicle such as an electric vehicle or a hybrid vehicle. The secondary battery supplies electric power to a vehicle-mounted device of the vehicle, such as a drive motor or an auxiliary machine. The secondary battery is also a battery that can be charged by a charger serving as a vehicle-mounted device or a charging device outside the vehicle. For example, a lithium ion battery, a lead-acid battery, or a nickel metal hydride battery can be used as the secondary battery. In the present embodiment, a secondary battery mounted on a movable body will be described as an example, but the present invention can also be applied to a secondary battery mounted on a stationary body.

The control system for secondary battery 1 includes a vehicle control module (VCM) 10, a direct current (DC)/DC 20, an air conditioner (AC) 30, a positive temperature coefficient (PTC) 40, an inverter (INV) 50, a motor (MOT) 60, a charger 70, a secondary battery unit 100, and a battery management unit (BMS) 160.

The secondary battery unit 100 is implemented by housing a high-voltage battery 110, a service disconnect switch (SDSW) 111, and a relay 112 in a battery case. The high-voltage battery 110 includes a plurality of traveling batteries.

A reason why the high-voltage battery 110 is referred to as the traveling batteries is that electric power of the high-voltage battery 110 is mainly supplied to the MOT 60. Obviously, the electric power is also supplied to other electric loads. In the present embodiment, the high-voltage battery 110 is simply referred to as the term "battery".

The SDSW 111 is a switch for switching ON/OFF of a high-current circuit of the high-voltage battery 110. That is, it is possible to cut off a circuit by operating the SDSW 111 during operating or in an emergency, and to safely take measures during the operating or in the emergency.

The relay 112 is a relay that switches ON/OFF of charging and discharging of the high-voltage battery 110 based on a control signal from the VCM 10 via a signal line 11.

Temperature sensors 121 to 123, a current sensor 130, a total voltage sensor 140, and cell voltage sensors 151 to 153 are provided inside or outside the secondary battery unit 100.

The temperature sensors 121 to 123 are temperature sensors that detect a temperature of the high-voltage battery 110, and output detection results to the BMS 160. Although FIG. 1 illustrates an example in which a plurality of temperature sensors are provided in the secondary battery unit 100, one temperature sensor may be provided in the secondary battery unit 100. For example, when one temperature sensor is provided, the temperature sensor is preferably provided at a position where the temperature is most likely to increase in the secondary battery unit 100, for example, at a central portion. In addition, when the plurality of temperature sensors are provided, the plurality of temperature sensors may be provided at the position where the temperature is most likely to increase and positions around the position in the secondary battery unit 100. In this way, provided positions of the plurality of temperature sensors can be appropriately set depending on a layout in the secondary battery unit 100 and a traveling condition. When the plurality of temperature sensors are provided in the secondary battery unit 100, various calculations can be executed using a predetermined value among temperatures detected by these temperature sensors, for example, a maximum value. In the present embodiment, the temperature of the high-voltage battery 110 is also referred to as a battery temperature.

The current sensor 130 is a current sensor that detects a charging current or a discharging current of the high-voltage battery 110, and outputs a detection result to the BMS 160.

The total voltage sensor 140 is a voltage sensor that detects a total voltage of the high-voltage battery 110, and outputs a detection result to the BMS 160. When the high-voltage battery 110 is charged, a detection value of the charging voltage is obtained based on the detection result.

The cell voltage sensors 151 to 153 are cell voltage sensors that detect voltages of cells constituting the high-voltage battery 110, and output detection results to the BMS 160. That is, the cell voltage sensors 151 to 153 are provided in the cells constituting the high-voltage battery 110, and detect the voltages of the cells, respectively.

The BMS 160 is a control device that includes a states of charge (SOC) calculation unit 161 and a state of health (SOH) calculation unit 162, and manages a capacity, the temperature, the voltage, and the like of the high-voltage battery 110. The SOC is a value (0 to 100%) indicating a state of charge of the high-voltage battery 110. The SOH is a value (0 to 100%) indicating a deteriorating state of the high-voltage battery 110. Specifically, the smaller the value of the SOH, the further the deterioration of the high-voltage battery 110 progresses, and the larger the value of the SOH, the closer high-voltage battery 110 is to a state at the time of product shipment (hereinafter, referred to as an initial state).

The SOC calculation unit 161 calculates the SOC of the high-voltage battery 110 by a known calculation method, and outputs a calculation result to the VCM 10.

The SOH calculation unit 162 calculates the SOH of the high-voltage battery 110 by a known calculation method, and outputs a calculation result to the VCM 10. For example, the SOH calculation unit 162 acquires an internal resistance of the high-voltage battery 110 based on a calculation result obtained by an internal resistance calculation unit (not illustrated). The SOH calculation unit 162 calculates the SOH of the high-voltage battery 110 based on the internal resistance, an internal resistance in the initial state, and the temperatures of the high-voltage battery 110 detected by the temperature sensors 121 to 123. For example, the SOH calculation unit 162 may calculate the SOH of the high-voltage battery 110 based on the capacity of the high-voltage battery 110.

The VCM 10 is a vehicle control device that controls the entire vehicle, and is implemented by a microcomputer that includes a central processing unit (CPU), a read only memory (ROM), a random access memory (RAM), and an input and output interface (I/O interface). The VCM 10 may also be implemented by a plurality of microcomputers.

The DC/DC 20 is a DCDC converter that steps down a voltage to a predetermined voltage value when supplying electric power from the high-voltage battery 110 to a low-voltage battery (not illustrated) for supplying electric power to an auxiliary machine.

The AC 30 is an air-cooling system that cools a vehicle interior and parts of the vehicle with a predetermined refrigerant by heat exchange with air taken in from outside based on the control of the VCM 10.

The PTC 40 is a device that increases a resistance when an abnormally large current flows in the high-voltage battery 110, and limits the current. The PTC 40 may be provided inside the high-voltage battery 110, or may be provided outside the high-voltage battery 110.

The INV 50 is electrically connected to the MOT 60 and the high-voltage battery 110. The INV 50 converts AC power generated by the MOT 60 into DC power and supplies the DC power to the high-voltage battery 110, and converts DC power output from the high-voltage battery 110 into AC power and supplies the AC power to the MOT 60. In this way, the INV 50 functions as an inverter for the drive motor and a power generation motor.

During a power running operation, the MOT 60 is rotationally driven by an AC current supplied from the INV 50, and generates a driving force to be supplied to drive wheels. In addition, during a regenerative operation, the MOT 60 generates electrical energy to be recovered by the high-voltage battery 110. In this way, the MOT 60 functions as the drive motor and the power generation motor.

The charger 70 is, for example, a charging circuit (a DCDC converter or an inverter) connected to an external charger (including a quick charger), and outputs the electric power supplied from the charger to the high-voltage battery 110. When the vehicle is charged by being connected to the external charger, the charging voltage and the charging current are set based on the control of the VCM 10. [Electric Power Control Example]

Figure 2A:
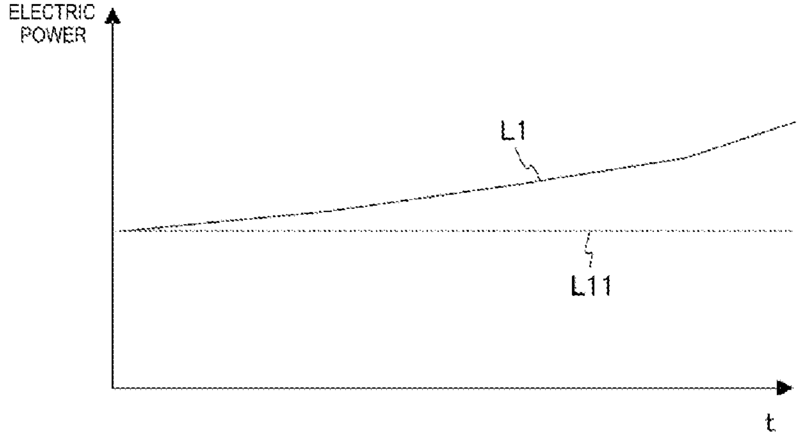
FIG. 2A is a graph illustrating an example of electric power transition when a high-voltage battery is charged.
Figure 2B:
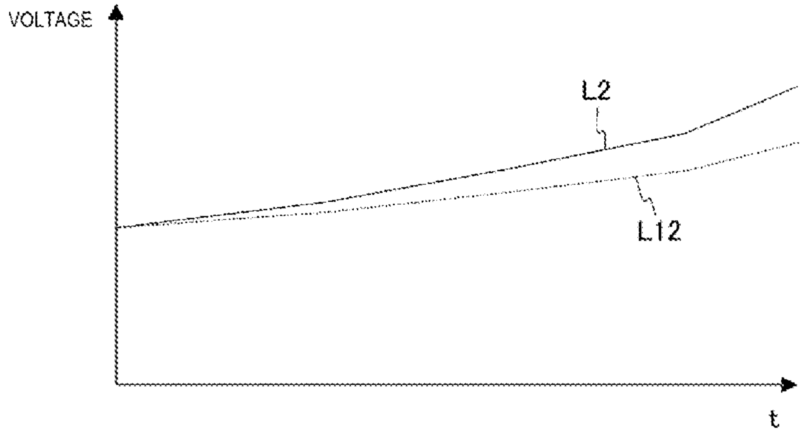
FIG. 2B is a graph illustrating an example of voltage transition when the high-voltage battery is charged.
Figure 2C:
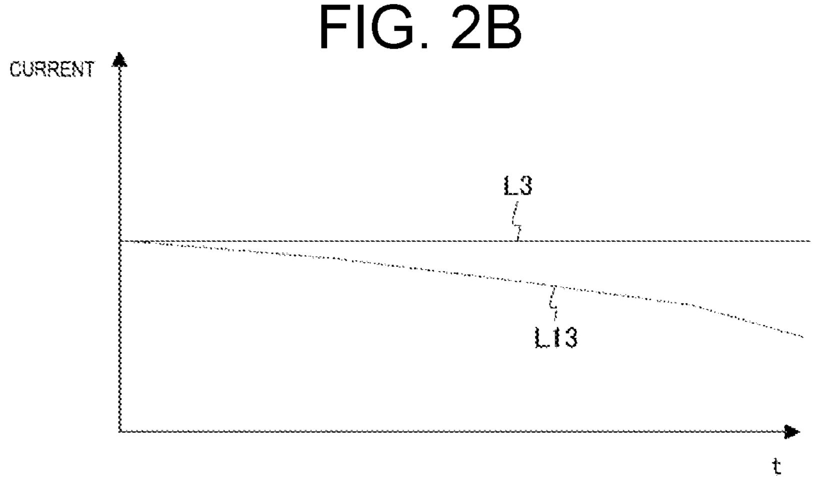
FIG. 2C is a graph illustrating an example of current transition when the high-voltage battery is charged.

FIG. 2A is a graph illustrating an example of electric power transition when the high-voltage battery 110 is charged. A vertical axis of FIG. 2A indicates the electric power when the high-voltage battery 110 is charged. In addition, a horizontal axis of FIG. 2A indicates a time axis. In FIGS. 2B and 2C, a horizontal axis also indicates a time axis.

FIG. 2B is a graph illustrating an example of voltage transition when the high-voltage battery 110 is charged. A vertical axis of FIG. 2B indicates the voltage when the high-voltage battery 110 is charged.

FIG. 2C is a graph illustrating an example of current transition when the high-voltage battery 110 is charged. A vertical axis of FIG. 2B indicates the current when the high-voltage battery 110 is charged.

In FIGS. 2A to 2C, lines L1 to L3 show transitions when the charging is performed such that an electric power value is set variable and the current value is constant. Dotted lines L11 to L13 are comparative examples with respect to the lines L1 to L3, and show transitions when the charging is performed such that the electric power is constant.

Here, when the charging is performed by setting the electric power constant (indicated by the dotted line L11) and the voltage increases due to the charging (indicated by the dotted line L12), the current value decreases (indicated by the dotted line L13). In this way, when the charging is performed by setting the electric power constant, the current value also changes in accordance with the change in the voltage. Here, the amount of heat generation by the high-voltage battery 110 is determined by the current and the internal resistance, and the electric power and the amount of heat generation are not in a proportional relation. Therefore, when the current value is not constant during the charging, the amount of heat generation cannot be controlled to be constant. That is, according to an electric power control method indicated by the dotted lines L11 to L13, since the current value is not constant during the charging, the amount of heat generation cannot be controlled to be constant, and a change in the amount of heat generation by the high-voltage battery 110 cannot be predicted. Therefore, it is also assumed that it is difficult to appropriately charge the high-voltage battery 110.

In addition, the high-voltage battery 110 deteriorates due to age of service and a travel distance of the vehicle, and the internal resistance and the SOC after the deterioration change. According to such changes in the SOC and the internal resistance associated with the charging and discharging of the high-voltage battery 110, the amount of heat generation changes. Therefore, in order to control the amount of heat generation to be constant, it is also important to take these changes into consideration.

Therefore, in the present embodiment, an example is described in which in order to control the amount of heat generation by the high-voltage battery 110 to be constant, charging control for setting the current during the charging constant is executed. That is, in the present embodiment, an example is described in which the amount of heat generation by the high-voltage battery 110 is controlled to be constant, and an increase in the temperature of the high-voltage battery 110 during the charging is limited. In the present embodiment, an example of charging control when the charging is performed by an external charger, for example, a quick charge (QC) will be described. Alternatively, the charging control according to the present embodiment can also be applied to charging inside the vehicle, for example, surplus charging while the vehicle is traveling.

[Example of Relation Between Battery Temperature and Charging Current During Charging]

Figures 3A, 3B:
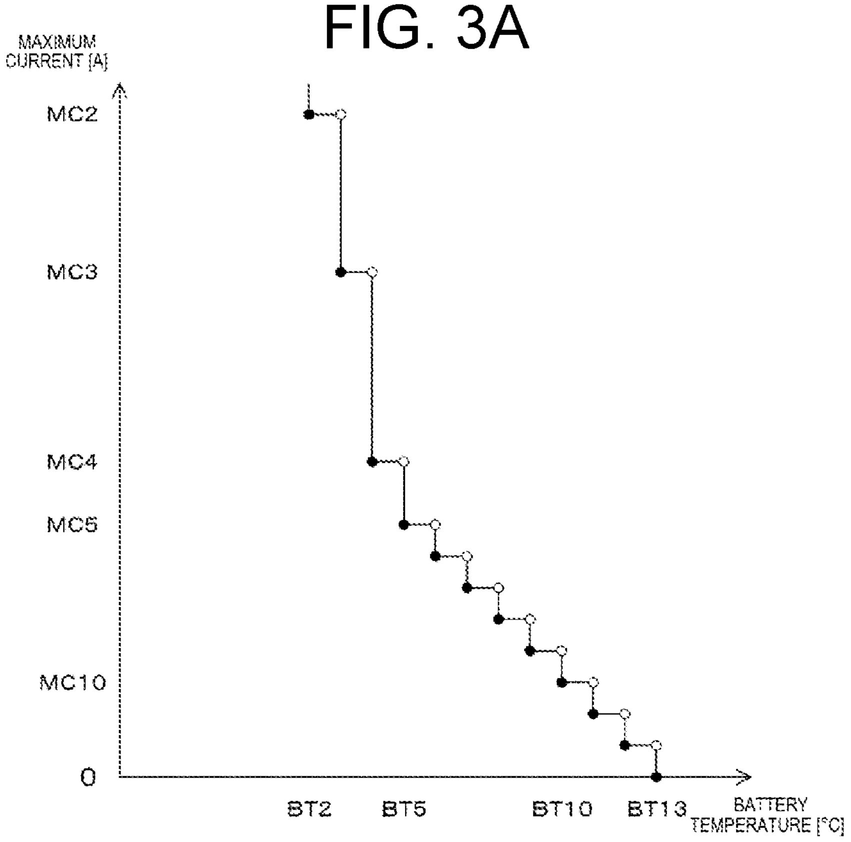
FIG. 3A is a diagram illustrating an example of a relation between a battery temperature and a maximum current during charging.
FIG. 3B is a graph illustrating an example of the relation between the battery temperature and the maximum current during charging illustrated in FIG. 3A.

FIG. 3A is a diagram illustrating an example of a relation between the battery temperature and the charging current during the charging. FIG. 3B is a graph illustrating the example of the relation between the battery temperature and the charging current during the charging illustrated in FIG. 3A. In the graph illustrated in FIG. 3B, a vertical axis indicates the charging current during the charging, and a horizontal axis indicates the battery temperature during the charging. A range from BT1 to BT13 can be a range of about 45° C. to 60° C. In addition, a value of about 125 A can be set as MC1.

In the present embodiment, a limited current value of the charging current (the maximum current) is changed according to the battery temperature. More specifically, the battery temperature is divided into a plurality of temperature regions (the BT1 to the BT2, the BT2 to the BT3 . . . and the BT12 to the BT13), and the higher the temperature region is, the larger the limited current value is set. In a lowest temperature region (the temperature region lower than the BT2), the charging current value is set to the MC1. In particular, the charging current value MC1 is a current value corresponding to a maximum charging electric power (a rated charging electric power) determined by a design of the external charger or the like. That is, in a low-temperature region where the battery temperature is unlikely to excessively increase, charging efficiency is prioritized, and the charging current value MC1 corresponding to the maximum charging electric power is set. As a specific scene of the charging in the low-temperature region, charging in a relatively initial stage immediately after the start of charging, or charging under an environment where a cooling function for the high-voltage battery 110 can be sufficiently secured is assumed.

Therefore, constant current charging is executed by the charging current value MC1 until the battery temperature exceeds the first threshold value BT2 (a value lower than the travel output limiting temperature BT13). Further, when the battery temperature exceeds the first threshold value BT2, the constant current charging is continued by changing the charging current value MC1 to a charging current value based on the battery temperature (a first limited current value MC2 smaller than the charging current value MC1). When the battery temperature exceeds an n-th threshold value temperature that is higher than a n−1-th threshold temperature (n is an integer equal to or greater than 2) and is lower than the travel output limiting temperature BT13, the charging is continued by an n-th limited current value smaller than an n−1-th limited current value. In addition, the nearer to an initial stage of a real-time current limitation (immediately after exceeding the first threshold value BT2), the larger a reduction value of the current in the limitation is, and the reduction value decreases as the battery temperature increases. For example, it is possible to set |initial charging current value MC1—first limited current value MC2|>|first limited current value MC2—second limited current value MC3|>|second limited current value MC3—third limited current value MC4|> . . . . However, when the battery temperature exceeds a predetermined battery temperature, the reduction value of the current may be set to a constant value. For example, the reduction value of the current after exceeding the fourth threshold value BT5 can be set to a constant value. When the constant current charging is continuously performed in this manner, the charging current value can be set by other elements (for example, the SOH, an outside air temperature, the amount of heat generation, an amount of heat dissipation and a cooling st) together with the battery temperature. In this way, the amount of heat generation by the high-voltage battery 110 can be reduced stepwise to adjust heat balance, and the battery temperature can be stabilized.

As illustrated in FIG. 3B, a relation between the battery temperature and the maximum current during the charging can be set using a constant map (a temperature-current map). Lattice points (white circles and black circles) in the constant map can be referred to as current limiting values specified by the temperatures at both ends. In order to specify a current value under a discrete temperature condition of about 1° C. even in a map in which the temperature condition is described in detail, it is possible to express that the current during this period is limited by a linear approximation, an exponential approximation or the like as a current limiting value between predetermined battery temperatures. In this way, in the present embodiment, the charging current value can be calculated based on a determined numerical value interpolation equation by using the charging current value specified by the temperatures at both ends. The constant map is a map set in advance in order to control the amount of heat generation or the battery temperature to a predetermined value.

[Charging Control Example of Secondary Battery]

Figure 4:
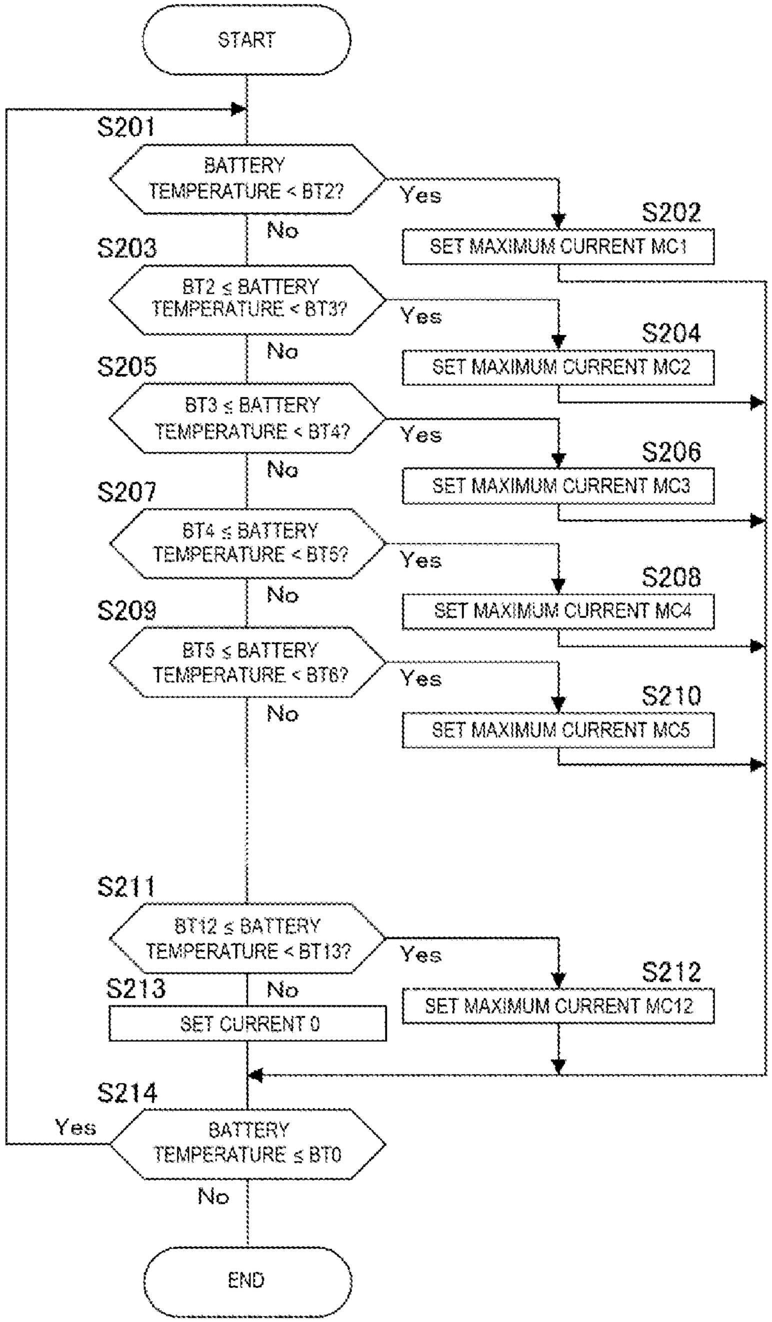
FIG. 4 is a flowchart illustrating an example of a procedure of a charging control process for the high-voltage battery performed by VCM.

FIG. 4 is a flowchart illustrating an example of a procedure of a charging control process for the high-voltage battery 110 performed by the VCM 10. This procedure is executed based on a program stored in a storage device (not illustrated). In addition, this procedure is repeatedly executed at a predetermined interval after the charging of the high-voltage battery 110 is started.

It is assumed that the VCM 10 acquires various kinds of information to be used for the charging control at a predetermined timing. The various kinds of information to be used for the charging control are, for example, the detection results output from the sensors (the temperature sensors 121 to 123, the current sensor 130, the total voltage sensor 140, and the cell voltage sensors 151 to 153), and the calculation results output from the calculation units (the SOC calculation unit 161 and the SOH calculation unit 162). Further, based on these input values, the VCM 10 operates the charger 70 to adjust the charging voltage to achieve a desired charging current. In the temperature region in which the battery temperature is lower than the BT2, the charging current can be set to the maximum value MC1 corresponding to the maximum charging electric power. In examples illustrated in FIGS. 5 to 16, similarly, the various kinds of information to be used for the charging control are acquired at the predetermined timing, and in the temperature region in which the battery temperature is lower than the BT2, the maximum value MC1 is set as the charging current value.

In step S201, the VCM 10 determines whether the temperature of the high-voltage battery 110 is lower than the BT2. When the temperature of the high-voltage battery 110 is lower than the BT2, the procedure proceeds to step S202. On the other hand, when the temperature of the high-voltage battery 110 is equal to or higher than the BT2, the procedure proceeds to step S203.

In step S202, the VCM 10 sets the MC1 as a maximum charging current value to the high-voltage battery 110.

In step S203, the VCM 10 determines whether the temperature of the high-voltage battery 110 is equal to or higher than the BT2 and is lower than the BT3. When the temperature of the high-voltage battery 110 is equal to or higher than the BT2 and is lower than the BT3, the procedure proceeds to step S204. On the other hand, when the temperature of the high-voltage battery 110 is equal to or higher than the BT3, the procedure proceeds to step S205.

In step S204, the VCM 10 sets the MC2 as the maximum charging current value to the high-voltage battery 110.

In step S205, the VCM 10 determines whether the temperature of the high-voltage battery 110 is equal to or higher than the BT3 and is lower than the BT4. When the temperature of the high-voltage battery 110 is equal to or higher than the BT3 and is lower than the BT4, the procedure proceeds to step S206. On the other hand, when the temperature of the high-voltage battery 110 is equal to or higher than the BT4, the procedure proceeds to step S207.

In step S206, the VCM 10 sets the MC3 as the maximum charging current value to the high-voltage battery 110.

In step S207, the VCM 10 determines whether the temperature of the high-voltage battery 110 is equal to or higher than the BT4 and is lower than the BT5. When the temperature of the high-voltage battery 110 is equal to or higher than the BT4 and is lower than the BT5, the procedure proceeds to step S208. On the other hand, when the temperature of the high-voltage battery 110 is equal to or higher than the BT5, the procedure proceeds to step S209.

In step S208, the VCM 10 sets the MC4 as the maximum charging current value to the high-voltage battery 110.

In step S209, the VCM 10 determines whether the temperature of the high-voltage battery 110 is equal to or higher than the BT5 and is lower than the BT6. When the temperature of the high-voltage battery 110 is equal to or higher than the BT5 and is smaller than the BT6, the procedure proceeds to step S210.

In step S210, the VCM 10 sets MC5 as the maximum charging current value to the high-voltage battery 110.

In step S209, when the temperature of the high-voltage battery 110 is equal to or higher than the BT6, a process based on the example of the relation between the battery temperature and the maximum current during the charging illustrated in FIG. 3A is repeatedly performed in the same manner as the processes illustrated in steps S201 to S210. In FIG. 4, the procedure up to step S211 is omitted.

In step S211, the VCM 10 determines whether the temperature of the high-voltage battery 110 is equal to or higher than the BT12 and is lower than the BT13. When the temperature of the high-voltage battery 110 is equal to or higher than the BT12 and is lower than the BT13, the procedure proceeds to step S212. On the other hand, when the temperature of the high-voltage battery 110 is equal to or higher than the BT13, the procedure proceeds to step S213.

In step S212, the VCM 10 sets MC12 as the maximum charging current value to the high-voltage battery 110.

In step S213, the VCM 10 sets 0 as the charging current value of the high-voltage battery 110. In this case, the charging to the high-voltage battery 110 is stopped. That is, the supply of electric power is prohibited when the temperature is equal to or higher than the predetermined temperature BT13. When the battery temperature is lowered, the charging can be restarted.

In step S214, the VCM 10 determines whether the temperature of the high-voltage battery 110 is equal to or lower than a predetermined value BT0. This determination process may be executed after predetermined time elapsed. The predetermined time is, for example, time to the extent that an effect after the setting of the maximum charging current value is exhibited after the charging by the maximum charging current values set by the processes described above is executed.

The predetermined value BT0 is a reference value for increasing the charging current again when the battery temperature decreases. As the predetermined value BT0, for example, a value less than the BT1 can be used. For example, a value obtained by subtracting a temperature corresponding to a hysteresis portion from the BT1 can be set as the predetermined value BT0. When the temperature of the high-voltage battery 110 is equal to or lower than the predetermined value BT0, the procedure returns to step S201. On the other hand, when the temperature of the high-voltage battery 110 is higher than the predetermined value BT0, an operation of the charging control process for the high-voltage battery 110 is ended.

The determination process shown in step S214 may be executed at a predetermined timing after setting processes of the maximum charging current value according to the temperature of the high-voltage battery 110 (steps S202, S204, S206, S208, S210, and S212). In this case, as the predetermined value BT0, the temperature at the start of the procedure illustrated in FIG. 4 or at the time of each determination process, or a value obtained by subtracting the predetermined temperature corresponding to the hysteresis portion from the temperature may be used.

In this way, in the example illustrated in FIG. 4, it is possible to achieve appropriate charging control by performing the real-time current limitation. As illustrated in FIG. 3B, an amount of change in the charging current value set in this case increases as the battery temperature decreases (as the maximum current to be set increases), and the amount of change decreases as the battery temperature increases.

In this way, in the example illustrated in FIG. 4, it is possible to set an appropriate charging current value according to the temperature of the high-voltage battery 110. Further, as illustrated in FIGS. 5 to 16, the charging current value corresponding to the temperature of the high-voltage battery 110 can also be set to a current value that is adaptable to various conditions, for example, the SOH or the outside air temperature. In this way, according to the present embodiment, it is possible to set an appropriate charging current limitation according to the various conditions.

In addition, in the example illustrated in FIG. 4, since the process based on the example of the relation illustrated in FIG. 3A is performed, a processing load on the VCM 10 can be reduced, and a control implementation can be facilitated.

[Charging Control Example in Consideration of Deterioration of Secondary Battery]

Next, an example of controlling the charging current value in consideration of the deterioration of the high-voltage battery 110 will be described. Specifically, in a case of a condition where the temperature of the high-voltage battery 110 is likely to increase, for example, in a case of a condition where the high-voltage battery 110 deteriorates and is likely to generate heat, the high-voltage battery 110 is likely to become high in temperature. Here, the control system for secondary battery 1 has a function of stopping charging when the temperature of the high-voltage battery 110 reaches a predetermined value (that is, when the high-voltage battery 110 has a higher temperature than the predetermined value). However, it is possible to prevent the charging from being stopped by appropriately controlling the temperature of the high-voltage battery 110 and to continuously charge the high-voltage battery 110, and it is possible to secure a charge amount of the high-voltage battery 110. Therefore, in the case of the condition where the high-voltage battery 110 deteriorates and is likely to generate heat, in order to secure the charge amount of the high-voltage battery 110, a setting of further limiting the maximum charging current value as the temperature of the high-voltage battery 110 increases and continuously performing the charging to the high-voltage battery 110 is set.

Figure 5:
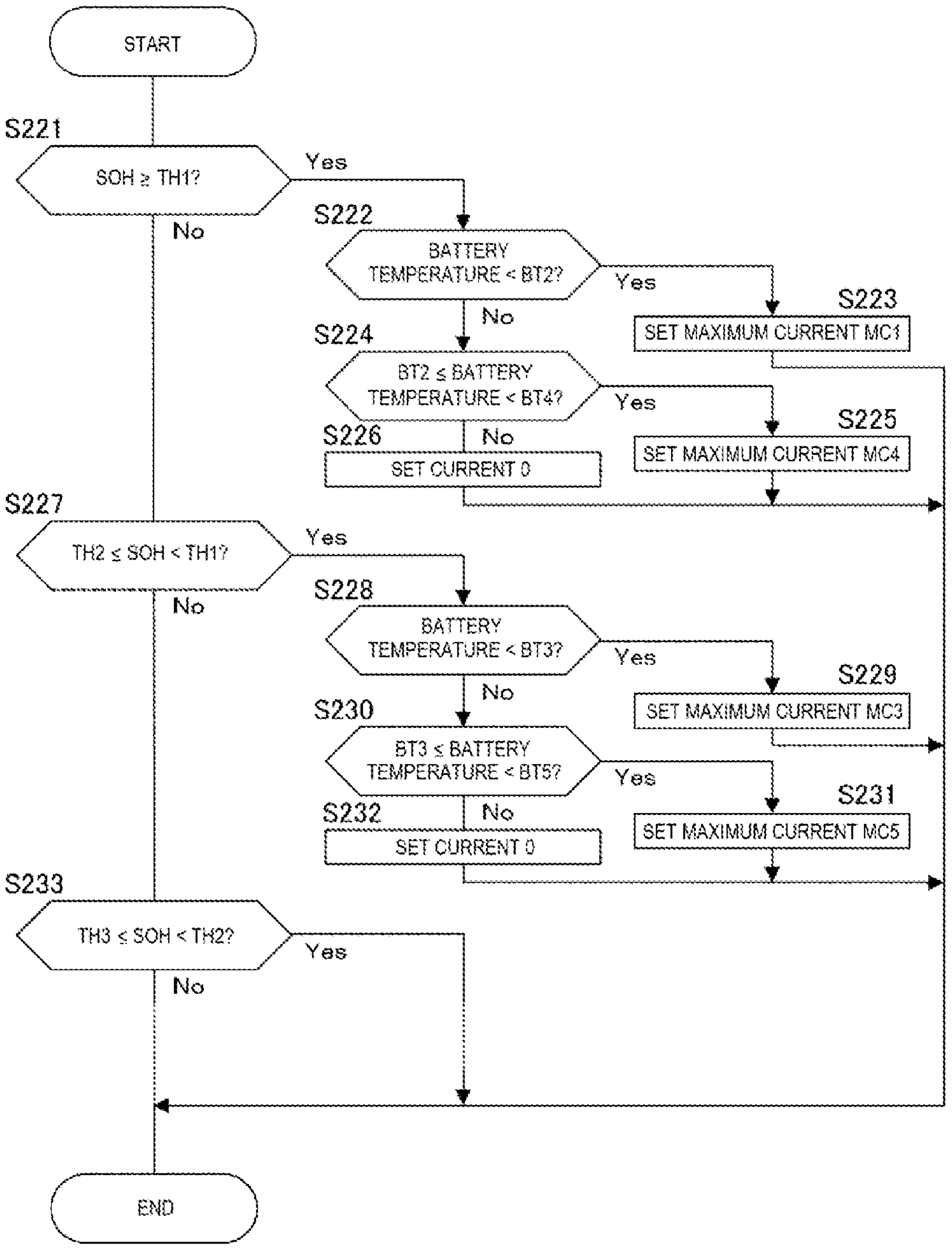
FIG. 5 is a flowchart illustrating an example of the procedure of the charging control process for the high-voltage battery performed by the VCM.

FIG. 5 is a flowchart illustrating an example of the procedure of the charging control process for the high-voltage battery 110 performed by the VCM 10. This procedure is executed based on a program stored in the storage device (not illustrated). In addition, this procedure is repeatedly executed at a predetermined interval after the charging of the high-voltage battery 110 is started.

In step S221, the VCM 10 determines whether the SOH of the high-voltage battery 110 is equal to or larger than a threshold value TH1. Here, the threshold value TH1 is a reference value for determining a degree of deterioration of the high-voltage battery 110. Specifically, the threshold value TH1 is a reference value for determining that the degree of deterioration of the high-voltage battery 110 is in a low state, for example, in an initial state, and a value of, for example, about 90% can be used as the threshold value TH1. When the SOH of the high-voltage battery 110 is equal to or larger than the threshold value TH1, the procedure proceeds to step S222. On the other hand, when the SOH of the high-voltage battery 110 is less than the threshold value TH1, the procedure proceeds to step S227.

In step S222, the VCM 10 determines whether the temperature of the high-voltage battery 110 is lower than the BT2. When the temperature of the high-voltage battery 110 is lower than the BT2, the procedure proceeds to step S223. On the other hand, when the temperature of the high-voltage battery 110 is equal to or higher than the BT2, the procedure proceeds to step S224.

In step S223, the VCM 10 sets the MC1 as the maximum charging current value to the high-voltage battery 110.

In step S224, the VCM 10 determines whether the temperature of the high-voltage battery 110 is equal to or higher than the BT2 and is lower than the BT4. When the temperature of the high-voltage battery 110 is equal to or higher than the BT2 and is lower than the BT4, the procedure proceeds to step S225. On the other hand, when the temperature of the high-voltage battery 110 is equal to or higher than the BT4, the procedure proceeds to step S226.

In step S225, the VCM 10 sets the MC4 as the maximum charging current value to the high-voltage battery 110.

In step S226, the VCM 10 sets 0 as the charging current value of the high-voltage battery 110. In this case, the charging to the high-voltage battery 110 is stopped.

In this way, when the value of the SOH is relatively large (Yes in step S221), that is, when the high-voltage battery 110 is in the initial state, it is assumed that the high-voltage battery 110 is unlikely to generate heat as compared with the case where the high-voltage battery 110 is in the deteriorating state, and the increase in the temperature of the high-voltage battery 110 is relatively slow. Therefore, when the temperature of the high-voltage battery 110 is lower than the BT2, the maximum charging current value is maintained or set to the charging current value MC1 corresponding to the above-described maximum charging electric power. On the other hand, when the value of the SOH is relatively small (No in step S221), it is considered that the high-voltage battery 110 deteriorates and the temperature thereof is likely to increase. Therefore, even when the temperature of the high-voltage battery 110 is lower than the BT2, processes after Step S227 are executed on an assumption that the maximum charging current value is set to be smaller than the MC1.

In step S227, the VCM 10 determines whether the SOH of the high-voltage battery 110 is smaller than the threshold value TH1 and is equal to or larger than a threshold value TH2. Here, the threshold value TH2 is a value smaller than the threshold value TH1 and is a reference value for determining the degree of deterioration of the high-voltage battery 110. Specifically, the threshold value TH2 is a reference value for determining that the degree of deterioration of the high-voltage battery 110 is moderate, for example, in an intermediate state, and a value of, for example, about 80% can be used as the threshold value TH2. When the SOH of the high-voltage battery 110 is smaller than the threshold value TH1 and is equal to or larger than the threshold value TH2, the procedure proceeds to step S228. On the other hand, when the SOH of the high-voltage battery 110 is smaller than the threshold value TH2, the procedure proceeds to step S233.

In step S228, the VCM 10 determines whether the temperature of the high-voltage battery 110 is lower than the BT3. When the temperature of the high-voltage battery 110 is lower than the BT3, the procedure proceeds to step S229. On the other hand, when the temperature of the high-voltage battery 110 is equal to or higher than the BT3, the procedure proceeds to step S230.

In step S229, the VCM 10 sets the MC3 as the maximum charging current value to the high-voltage battery 110.

In step S230, the VCM 10 determines whether the temperature of the high-voltage battery 110 is equal to or higher than the BT3 and is lower than the BT5. When the temperature of the high-voltage battery 110 is equal to or higher than the BT3 and is lower than the BT5, the procedure proceeds to step S231. On the other hand, when the temperature of the high-voltage battery 110 is equal to or higher than the BT5, the procedure proceeds to step S232.

In step S231, the VCM 10 sets the MC5 as the maximum charging current value to the high-voltage battery 110.

In step S232, the VCM 10 sets 0 as the charging current value of the high-voltage battery 110. In this case, the charging to the high-voltage battery 110 is stopped.

In this way, when the value of the SOH is moderate, that is, when the high-voltage battery 110 is in the intermediate state, it is assumed that the high-voltage battery 110 is more likely to generate heat as compared with the case where the high-voltage battery 110 is in the initial state, and the increase in the temperature of the high-voltage battery 110 is relatively fast. Therefore, the relatively high values BT3 and BT5 are used as the determination references in steps S228 and S230. When the temperature of the high-voltage battery 110 is lower than the BT3, the relatively small value MC3 is set as the maximum charging current value to the high-voltage battery 110, unlike the example illustrated in FIG. 4. When the temperature of the high-voltage battery 110 is equal to or higher than the BT3 and is lower than the BT5, the relatively small value MC5 is set as the maximum charging current value to the high-voltage battery 110.

In step S230, the VCM 10 determines whether the SOH of the high-voltage battery 110 is smaller than the threshold value TH2 and is equal to or larger than a threshold value TH3. Here, the threshold value TH3 is a value smaller than the threshold value TH2 and is a reference value for determining the degree of deterioration of the high-voltage battery 110. Specifically, the threshold value TH3 is a reference value for determining that the degree of deterioration of the high-voltage battery 110 is in a late stage, for example, a late state, and a value of, for example, about 70% can be used as the threshold value TH3.

When the SOH of the high-voltage battery 110 is smaller than the threshold value TH2 and is equal to or larger than the threshold value TH3, substantially the same processes as the processes of steps S222 to S226 and S228 to S232 are performed, and illustration thereof by the drawings is omitted. The processes after Step S230 are performed under conditions that are severer than determination conditions used in the processes of steps S228 to S232.

When the SOH of the high-voltage battery 110 is smaller than the threshold value TH3, substantially the same determination processes as the processes of steps S221 and S227 are performed. In the determination processes in this case, a value TH4 smaller than the TH3 is used as a threshold value.

In this way, as processes after step S233, substantially the same processes as the processes of steps S221 to S226 and S227 to S232 are performed once or a plurality of times.

In this way, when the value of the SOH is relatively small, that is, when the high-voltage battery 110 is in the late state, it is assumed that the high-voltage battery 110 is more likely to generate heat as compared with the cases where the high-voltage battery 110 is in the initial state or in the intermediate state, and the increase in the temperature of the high-voltage battery 110 is also fast. Therefore, larger values are used as the determination references in the same processes as the processes of steps S228 and S230. Further, values smaller than that of the processes of steps S221 to S226 and S227 to S232 are set as the maximum charging current value to the high-voltage battery 110.

[Modification of Charging Control in Consideration of Deterioration of Secondary Battery]

FIG. 5 illustrates an example in which the maximum charging current value is set using two determination references for the battery temperature after the determination processes for the SOH. Alternatively, after the determination processes for the SOH, the maximum charging current value may be set by using three or more determination references for the battery temperature. Therefore, FIG. 6 illustrates an example in which the maximum charging current value is set using three or more determination references for the battery temperature after the determination processes for the SOH.

Figure 6:
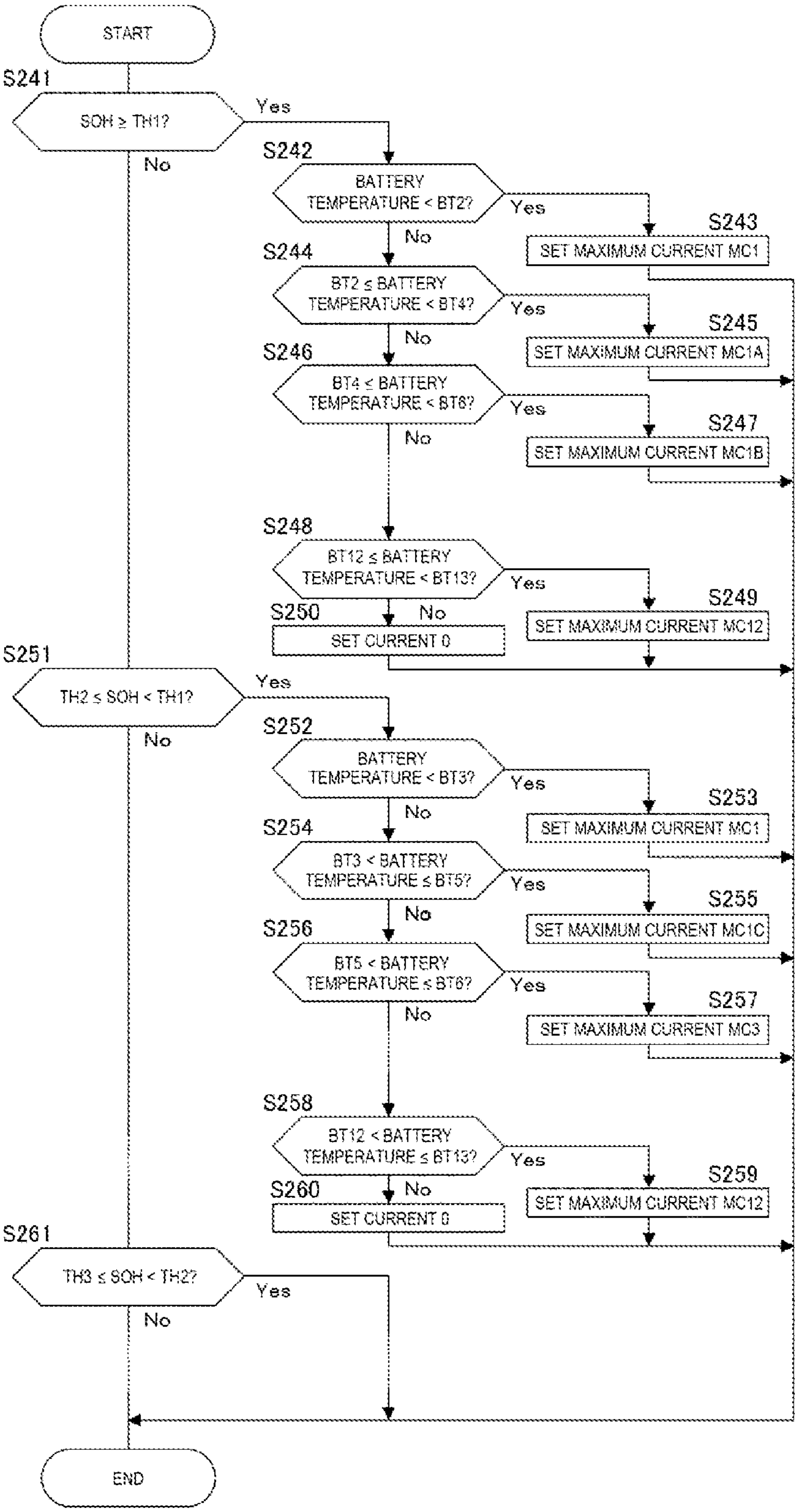
FIG. 6 is a flowchart illustrating an example of the procedure of the charging control process for the high-voltage battery performed by the VCM.

FIG. 6 is a flowchart illustrating an example of the procedure of the charging control process for the high-voltage battery 110 performed by the VCM 10. The procedure illustrated in FIG. 6 is an example obtained by modifying a part of the procedure illustrated in FIG. 5, and regarding a part common to the procedure illustrated in FIG. 5, a part of the description thereof is omitted.

Specifically, FIG. 5 illustrates an example in which the maximum charging current value is set using the two determination references (the BT2 and the BT4 after step S221, and the BT3 and the BT5 after step S227) after the determination process for the SOH (step S221 and step S227). On the other hand, FIG. 6 illustrates an example in which the maximum charging current value is set using a plurality of determination references (the BT2 to the BT13) after the determination processes for the SOH (steps S241 and S251).

In this way, in FIG. 6, since the maximum charging current value is set using the plurality of determination references (the BT2 to the BT13), when the battery temperature is relatively low, a relatively large value is set as the maximum charging current value.

Specifically, a case is assumed where after it is determined in step S241 that the SOH of the high-voltage battery 110 is equal to or larger than the threshold value TH1, it is determined in step S244 that the temperature of the high-voltage battery 110 is equal to or higher than the BT2 and is lower than the BT4. In this case, in step S245, the VCM 10 sets an MC1A as the maximum charging current value to the high-voltage battery 110. Here, the MC1A is a value that is smaller than the MC1 and is larger than the MC2. For example, a value of about 100 A can be used as the MC1A.

In addition, a case is assumed where it is determined in step S246 that the temperature of the high-voltage battery 110 is equal to or higher than the BT4 and is lower than the BT6. In this case, in step S247, the VCM 10 sets an MC1B as the maximum charging current value to the high-voltage battery 110. Here, the MC1B is a value that is smaller than the MC1A and is larger than the MC2. For example, a value of about 80 A can be used as the MC1B.

In addition, a case is assumed where after it is determined in step S251 that the SOH of the high-voltage battery 110 is smaller than the threshold value TH1 and is equal to or larger than the threshold value TH2, it is determined in step S254 that the temperature of the high-voltage battery 110 is equal to or higher than the BT3 and is lower than the BT5. In this case, in step S255, the VCM 10 sets an MC1C as the maximum charging current value to the high-voltage battery 110. Here, the MC1C is a value that is smaller than the MC1B and is larger than the MC2. For example, a value of about 60 A can be used as the MC1C.

In addition, with respect to the processes up to step S248 after it is determined in step S246 that the temperature of the high-voltage battery 110 is equal to or higher than the BT6, the determination processes based on the predetermined battery temperatures and the setting processes of the maximum charging current value are repeatedly performed as in the example illustrated in FIG. 4. The relation between the battery temperatures used in the determination processes in this case and the maximum charging current values set in the setting processes can be set appropriately. In FIG. 6, the procedure from step S247 to step S248 is omitted.

In addition, with respect to the processes up to step S258 after it is determined in step S256 that the temperature of the high-voltage battery 110 is equal to or higher than the BT6, the determination processes based on the predetermined battery temperatures and the setting processes of the maximum charging current value are repeatedly performed as in the example illustrated in FIG. 4. The relation between the battery temperatures used in the determination processes in this case and the maximum charging current values set in the setting processes can also be set appropriately. However, it is preferable to set the maximum charging current value to a small value according to the relation between the battery temperatures and the maximum charging current values used in the processes from step S247 to S248. In FIG. 6, the procedure from step S257 to S258 is omitted.

In addition, FIG. 6 illustrates an example in which the maximum charging current value MC12 of the high-voltage battery 110 is set when it is determined in steps S248 and S258 that the temperature of the high-voltage battery 110 is higher than the BT12 and is lower than the BT13. In addition, FIG. 6 illustrates an example in which the charging current value 0 of the high-voltage battery 110 is set when it is determined in steps S248 and S258 that the temperature of the high-voltage battery 110 is higher than the BT13. However, a reference temperature for setting the maximum charging current value MC12 and the charging current value 0 may be set to a value lower than the BT12. For example, the reference temperature may be set to a small value in accordance with a speed of the vehicle in order to avoid a limitation during traveling caused by an increase in the battery temperature due to heat generation during traveling while the vehicle is traveling.

[Modification of Charging Control in Consideration of Charging During Traveling]

It is assumed that in an environment or a condition in which the battery temperature is likely to increase, the battery temperature is also likely to increase even during the traveling of the vehicle. Therefore, when the charging is performed during the traveling in the environment or the condition in which the battery temperature is likely to increase, a timing of limiting the charging current value, that is, a timing of lowering the battery temperature may be advanced. That is, in a case of the environment or the condition in which the battery temperature is likely to increase, the timing of limiting the charging current value, that is, the timing of lowering the battery temperature may be advanced according to the environment or the condition. Therefore, FIGS. 7 and 8 illustrate examples in which the timing of limiting the charging current value is advanced and traveling performance is made constant while the vehicle is traveling.

Figure 7:
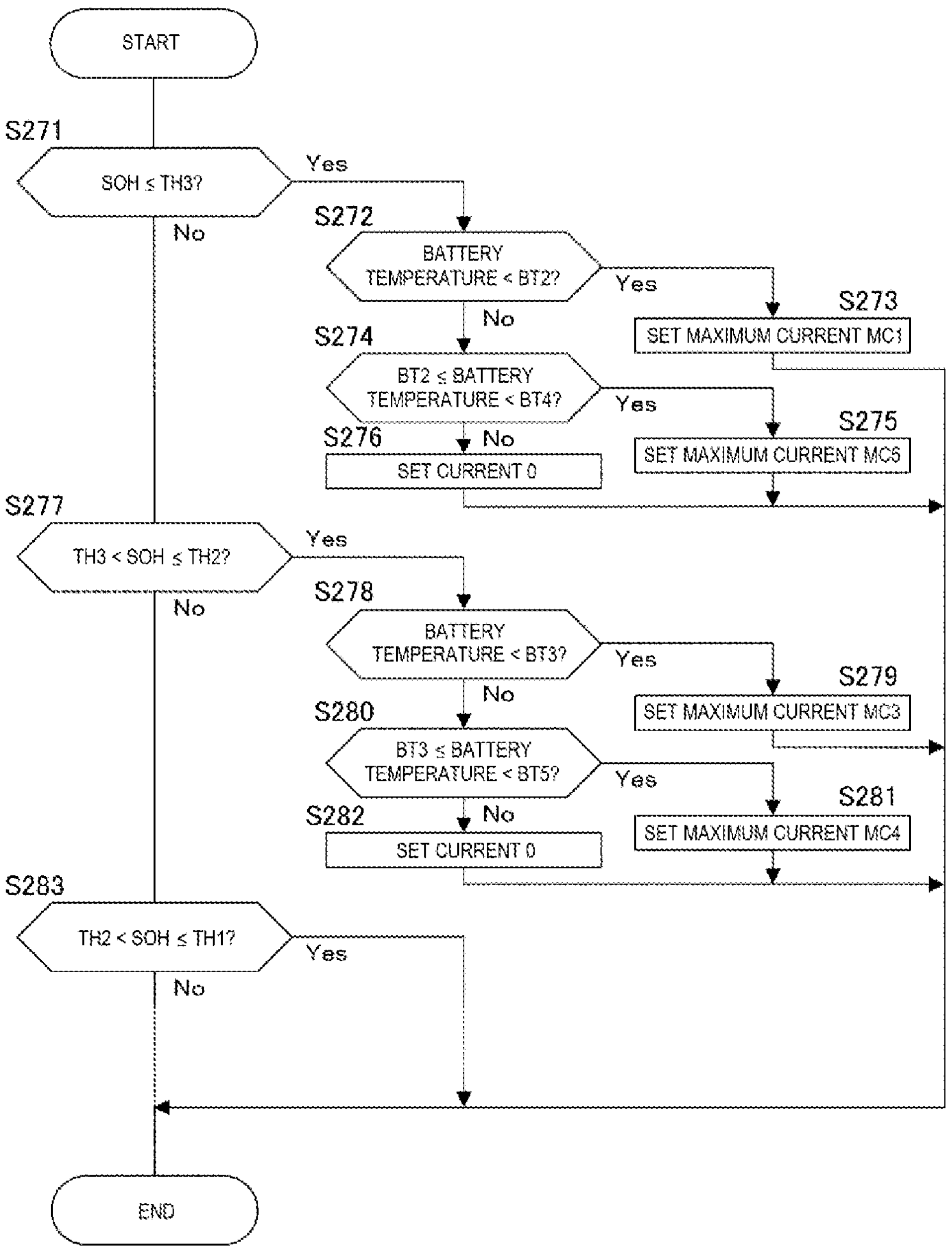
FIG. 7 is a flowchart illustrating an example of the procedure of the charging control process for the high-voltage battery performed by the VCM.
Figure 8:
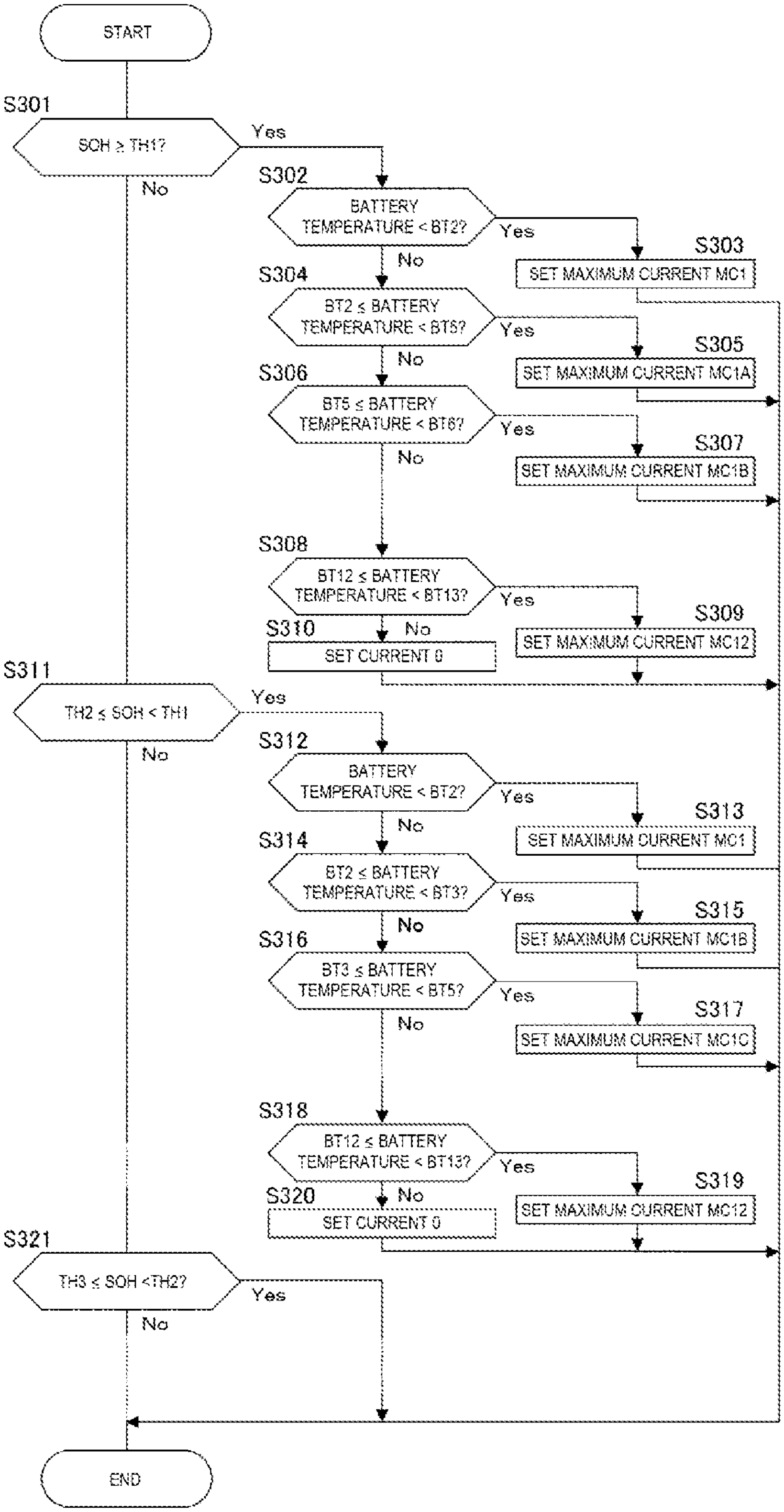
FIG. 8 is a flowchart illustrating an example of the procedure of the charging control process for the high-voltage battery performed by the VCM.

FIG. 7 is a flowchart illustrating an example of the procedure of the charging control process for the high-voltage battery 110 performed by the VCM 10. The procedure illustrated in FIG. 7 is an example obtained by modifying a part of the procedure illustrated in FIG. 5, and regarding a part common to the procedure illustrated in FIG. 5, a part of the description thereof is omitted.

With respect to processes of steps S272 to S276 and processes of steps S278 to S282, the determination processes based on the predetermined battery temperatures and the setting processes of the maximum charging current value are repeatedly performed as in the example illustrated in FIG. 5. The relation between the battery temperatures used in the determination processes in this case and the maximum charging current values set in the setting processes can be set appropriately.

For example, in FIG. 7, it can be determined at an early timing (the determination process of step S271) that the deterioration of the high-voltage battery 110 progresses. In this case, after it is determined that the SOH of the high-voltage battery 110 is equal to or larger than the threshold value TH3, the charging current value can be limited at an early timing. Therefore, even during the traveling of the vehicle in which the battery temperature is likely to increase, the charging can be maintained, and the traveling performance can be made constant.

[Example in which Threshold Value of Battery Temperature Lower than that in Initial State is Used in Intermediate State]

FIG. 8 is a flowchart illustrating an example of the procedure of the charging control process for the high-voltage battery 110 performed by the VCM 10. The procedure illustrated in FIG. 8 is an example obtained by modifying a part of the procedure illustrated in FIG. 6, and regarding a part common to the procedure illustrated in FIG. 6, a part of the description thereof is omitted.

Specifically, FIG. 6 illustrates an example in which the threshold values BT2, BT4, and BT6 are used as the determination reference in the determination processes of the battery temperature (steps S244 and S246). On the other hand, FIG. 8 illustrates an example in which the relatively high threshold values BT2, BT5, and BT6 are used as the determination reference in the determination processes of the battery temperature (steps S304 and S306).

In addition, FIG. 6 illustrates an example in which the threshold values BT3, BT5, and BT6 are used as the determination reference in the determination processes of the battery temperature (steps S254 and S256). On the other hand, FIG. 8 illustrates an example in which the relatively low threshold values BT2, BT3, and BT5 are used as the determination reference in the determination processes of the battery temperature (steps S314 and S316). In addition, FIG. 8 illustrates an example in which in the setting processes of the maximum charging current value (steps S315 and S317), the large values MC1B and MC1C are set in accordance with the small threshold values BT2, BT3, and BT5 serving as the determination reference.

With respect to processes of steps S301 to S310 and processes of steps S311 to S320, the determination processes based on the predetermined battery temperatures and the setting processes of the maximum charging current value are repeatedly performed as in the example illustrated in FIG. 6.

In this way, in FIG. 8, when the deterioration of the high-voltage battery 110 progresses, the charging current value can be limited at an early timing by using the relatively low threshold values BT2, BT3, and BT5. Therefore, even during the traveling of the vehicle in which the battery temperature is likely to increase, the charging can be maintained, and the traveling performance can be made constant.

[Example in which Same Threshold Value of Battery Temperature is Used in Initial State and Intermediate State]

Figure 9:
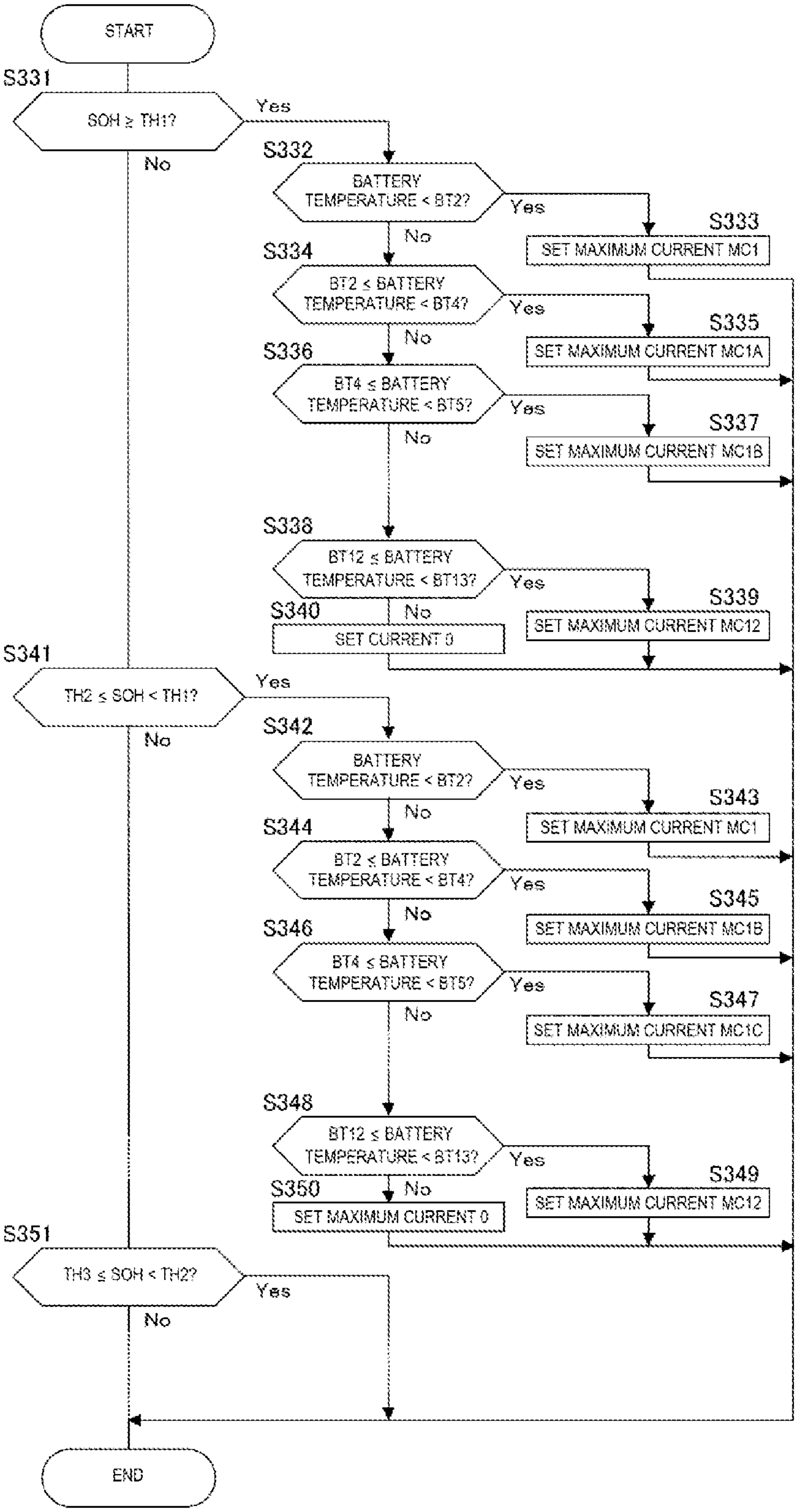
FIG. 9 is a flowchart illustrating an example of the procedure of the charging control process for the high-voltage battery performed by the VCM.

FIG. 9 is a flowchart illustrating an example of the procedure of the charging control process for the high-voltage battery 110 performed by the VCM 10. The procedure illustrated in FIG. 9 is an example obtained by modifying a part of the procedure illustrated in FIG. 8, and regarding a part common to the procedure illustrated in FIG. 8, a part of the description thereof is omitted.

Specifically, FIG. 8 illustrates an example in which the threshold values BT2, BT5, and BT6 are used as the determination reference in the determination processes of the battery temperature (steps S302, S304, and S306) when it is determined that the high-voltage battery 110 is in the initial state. In addition, FIG. 8 illustrates an example in which the threshold values BT2, BT3, and BT5 are used as the determination reference in the determination processes of the battery temperature (steps S312, S314, and S316) when it is determined that the high-voltage battery 110 is in the intermediate state.

On the other hand, FIG. 9 illustrates an example in which when it is determined that the high-voltage battery 110 is in the initial state, and when it is determined that the high-voltage battery 110 is in the intermediate state, the same threshold values BT2, BT4, and BT5 are used as the determination reference in the determination processes of the battery temperature (steps S332, S334, S336, S342, S344 and S346).

In this way, in FIG. 9, the processing load on the VCM 10 can be reduced by using the same threshold values BT2, BT4, and BT5 regardless of the deteriorating state of the high-voltage battery 110. Accordingly, the charging current value can be limited at an early timing. Therefore, even during the traveling of the vehicle in which the battery temperature is likely to increase, the charging can be maintained, and the traveling performance can be made constant.

[Example in which in Intermediate State, Threshold Value of Battery Temperature Smaller than that in Initial State is Used, but Same Maximum Charging Current Value is Used]

Figure 10:
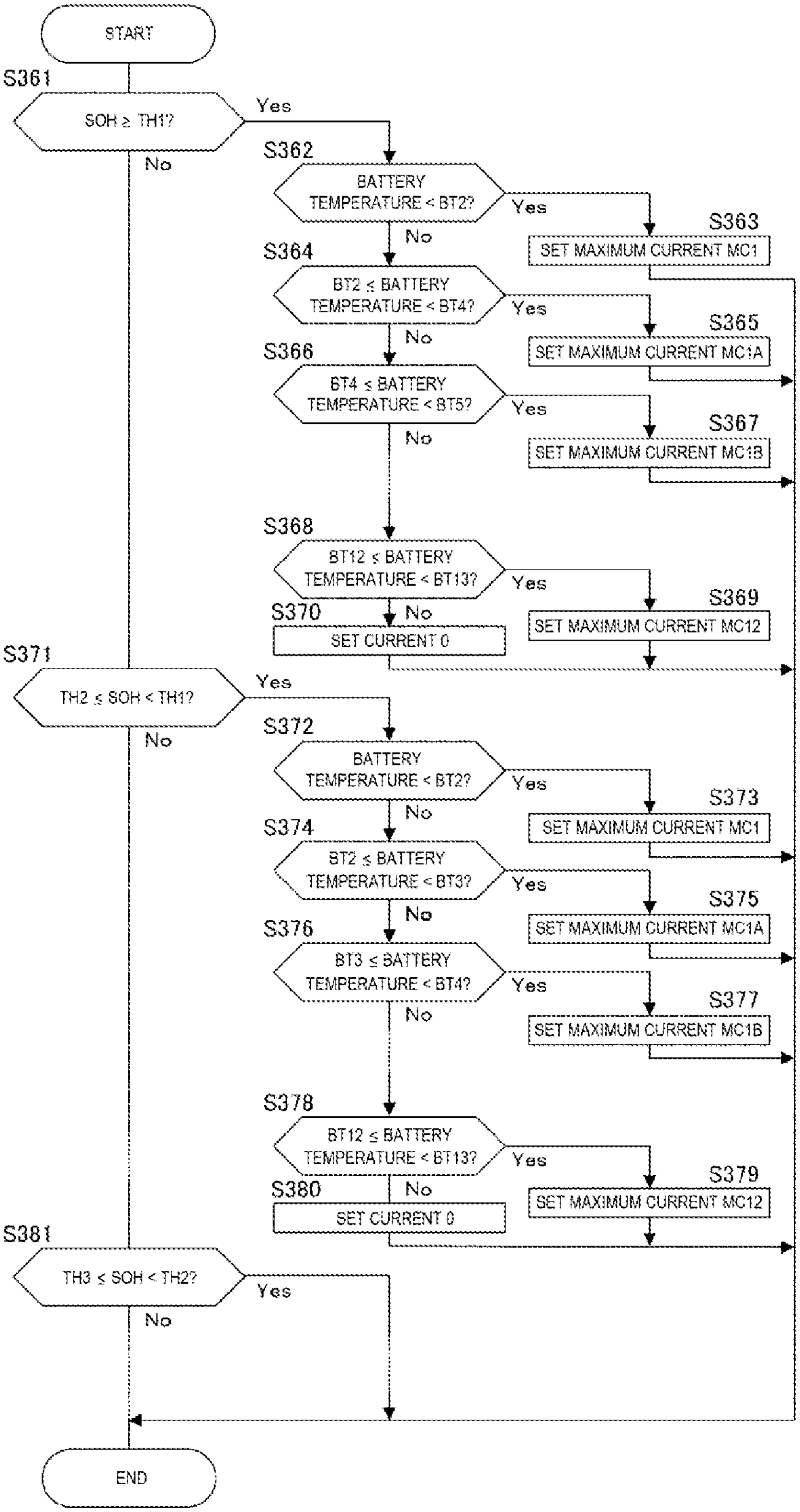
FIG. 10 is a flowchart illustrating an example of the procedure of the charging control process for the high-voltage battery performed by the VCM.

FIG. 10 is a flowchart illustrating an example of the procedure of the charging control process for the high-voltage battery 110 performed by the VCM 10. The procedure illustrated in FIG. 10 is an example obtained by modifying a part of the procedure illustrated in FIG. 8, and regarding a part common to the procedure illustrated in FIG. 8, a part of the description thereof is omitted.

Specifically, FIG. 10 illustrates an example in which the threshold values of the battery temperature (the threshold values BT2, BT3, and BT4) when it is determined that the high-voltage battery 110 is in the intermediate state are smaller than the threshold values of the battery temperature (the threshold values BT2, BT4, and BT5) when it is determined that the high-voltage battery 110 is in the initial state, as in the example illustrated in FIG. 8.

However, FIG. 10 illustrates an example in which when it is determined that the high-voltage battery 110 is in the initial state, and when it is determined that the high-voltage battery 110 is in the intermediate state, the same maximum charging current values MC1, MC1A, and MC1B are set in the setting processes of the maximum charging current value (steps S363, S365, S367, S373, S375, and S377).

In this way, in FIG. 10, the processing load on the VCM 10 can be reduced by using the same maximum charging current values MC1, MC1A, and MC1B regardless of the deteriorating state of the high-voltage battery 110. Accordingly, the charging current value can be limited at an early timing. Therefore, even during the traveling of the vehicle in which the battery temperature is likely to increase, the charging can be maintained, and the traveling performance can be made constant.

[Charging Control Example in Consideration of Air Temperature]

Next, an example of controlling the charging current value in consideration of air temperature will be described. Specifically, in the case of the condition where the temperature of the high-voltage battery 110 is likely to increase, for example, in a case of an environment or a condition in which the air temperature is high, the high-voltage battery 110 is likely to become high in temperature. Therefore, when such an environment or condition is satisfied, it is assumed that in order to secure the charge amount of the high-voltage battery 110, the maximum charging current value is further limited as the high-voltage battery 110 becomes high in temperature.

Figure 11:
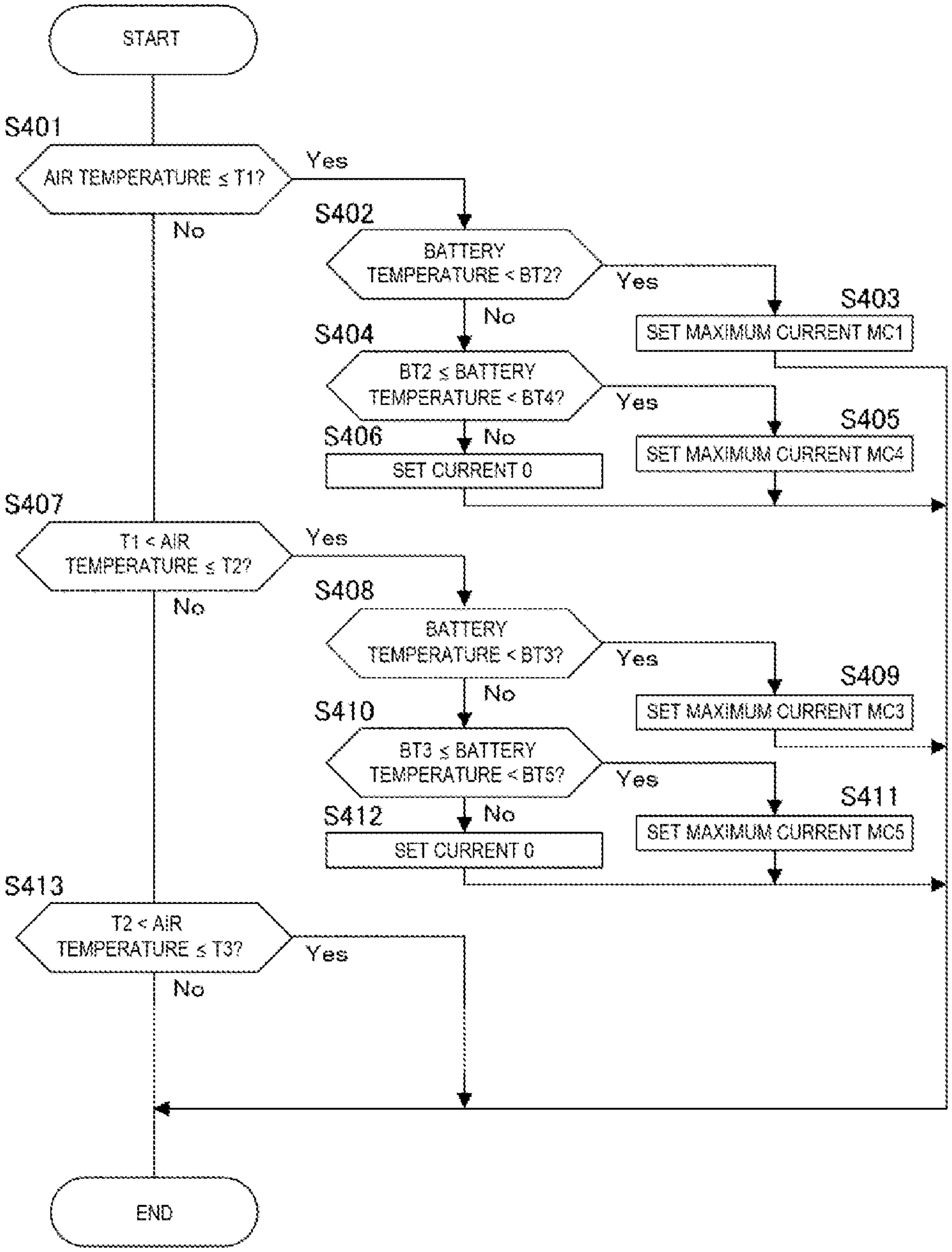
FIG. 11 is a flowchart illustrating an example of the procedure of the charging control process for the high-voltage battery performed by the VCM.

FIG. 11 is a flowchart illustrating an example of the procedure of the charging control process for the high-voltage battery 110 performed by the VCM 10. The procedure illustrated in FIG. 11 is an example obtained by modifying a part of the procedure illustrated in FIG. 5, and regarding a part common to the procedure illustrated in FIG. 5, a part of the description thereof is omitted.

In step S401, the VCM 10 determines whether the air temperature is equal to or lower than a threshold value T1. Here, the threshold value T1 is a reference value for determining whether the high-voltage battery 110 is likely to become high in temperature at the air temperature. Specifically, the threshold value T1 is a reference value for determining that the air temperature is in a relatively low state, and for example, a value of about 20° C. can be used as the threshold value T1. When the air temperature is equal to or lower than the threshold value T1, the procedure proceeds to step S402. On the other hand, when the air temperature is higher than the threshold value T1, the procedure proceeds to step S407.

Processes of steps S402 to S406 are the same as the processes of steps S222 to S226 illustrated in FIG. 5.

In this way, when the air temperature is relatively low, that is, in a case of an environment in which the high-voltage battery 110 is unlikely to become high in temperature, it is assumed that the high-voltage battery 110 is unlikely to generate heat as compared with the case where the air temperature is high, and the increase in the temperature of the high-voltage battery 110 is relatively slow. Therefore, when the temperature of the high-voltage battery 110 is lower than the BT2, the maximum charging current value is maintained or set to the charging current value MC1 corresponding to the above-described maximum charging electric power as in the example illustrated in FIG. 5. When the temperature of the high-voltage battery 110 is equal to or higher than the BT2 and is lower than the BT4, the relatively large value MC4 is set as the maximum charging current value to the high-voltage battery 110.

In step S407, the VCM 10 determines whether the air temperature is higher than the threshold value T1 and is equal to or lower than a threshold value T2. Here, the threshold value T2 is a value larger than the threshold value T1, and is a reference value for determining whether the high-voltage battery 110 is likely to become high in temperature at the air temperature. Specifically, the threshold value T2 is a reference value for determining that the air temperature is relatively high, and for example, a value of about 30° C. can be used as the threshold value T2. When the air temperature is higher than the threshold value T1, and is equal to or lower than the threshold value T2, the procedure proceeds to step S408. On the other hand, when the air temperature is higher than the threshold value T2, the procedure proceeds to step S413.

Processes of steps S408 to S412 are the same as the processes of steps S228 to S232 illustrated in FIG. 5.

In this way, when the air temperature is relatively high, it is assumed that the high-voltage battery 110 is likely to generate heat as compared with the case where the air temperature is relatively low, and the increase in the temperature of the high-voltage battery 110 is relatively fast. Therefore, the relatively low values BT3 and BT5 are used as the determination references in steps S408 and S410. When the temperature of the high-voltage battery 110 is lower than the BT3, the relatively small value MC3 is set as the maximum charging current value to the high-voltage battery 110 as in the example illustrated in FIG. 5. When the temperature of the high-voltage battery 110 is equal to or higher than the BT3 and is lower than the BT5, the relatively small value MC5 is set as the maximum charging current value to the high-voltage battery 110.

In step S413, the VCM 10 determines whether the air temperature is higher than the threshold value T2 and is equal to or lower than a threshold value T3. Here, the threshold value T3 is a value larger than the threshold value T2, and is a reference value for determining whether the high-voltage battery 110 is likely to become high in temperature at the air temperature. Specifically, the threshold value T3 is a reference value for determining that the air temperature is high, and for example, a value of about 35° C. can be used as the threshold value T3.

When the air temperature is higher than the threshold value T2 and is equal to or lower than the threshold value T3, substantially the same processes as the processes of steps S402 to S406 and S408 to S412 are performed, and illustration thereof by the drawings is omitted. Processes after step S413 are performed under conditions that are severer than the determination conditions used in the processes of steps S408 to S412.

When the air temperature is higher than the threshold value T3, substantially the same determination processes as the processes of steps S401 and S407 are performed. In the determination processes in this case, a value T4 higher than the T3 is used as a threshold value.

In this way, as the processes after step S413, substantially the same processes as the processes of steps S401 to S406 and S407 to S412 are performed once or a plurality of times.

In this way, when the air temperature is relatively high, it is assumed that the high-voltage battery 110 is more likely to generate heat, and the increase in the temperature of the high voltage battery 110 is also fast. Therefore, lower values are used as the determination reference in the same processes as the processes of steps S408 and S410. Further, values smaller than those of the processes of steps S403, S405, S409, and S411 are set as the maximum charging current value to the high-voltage battery 110.

[Charging Control Example in Consideration of Operation State of Cooling System]

Next, an example of controlling the charging current value in consideration of an operation state of a cooling system will be described. Specifically, in the case of the condition in which the temperature of the high-voltage battery 110 is likely to increase, for example, in a state in which the cooling system is not in operation, the high-voltage battery 110 is likely to become high in temperature during charging when the vehicle is stopped or charging when the vehicle is traveling. Therefore, when such an environment or condition is satisfied, it is assumed that in order to secure the charge amount of the high-voltage battery 110, the maximum charging current value is further limited as the high-voltage battery 110 becomes high in temperature.

Figure 12:
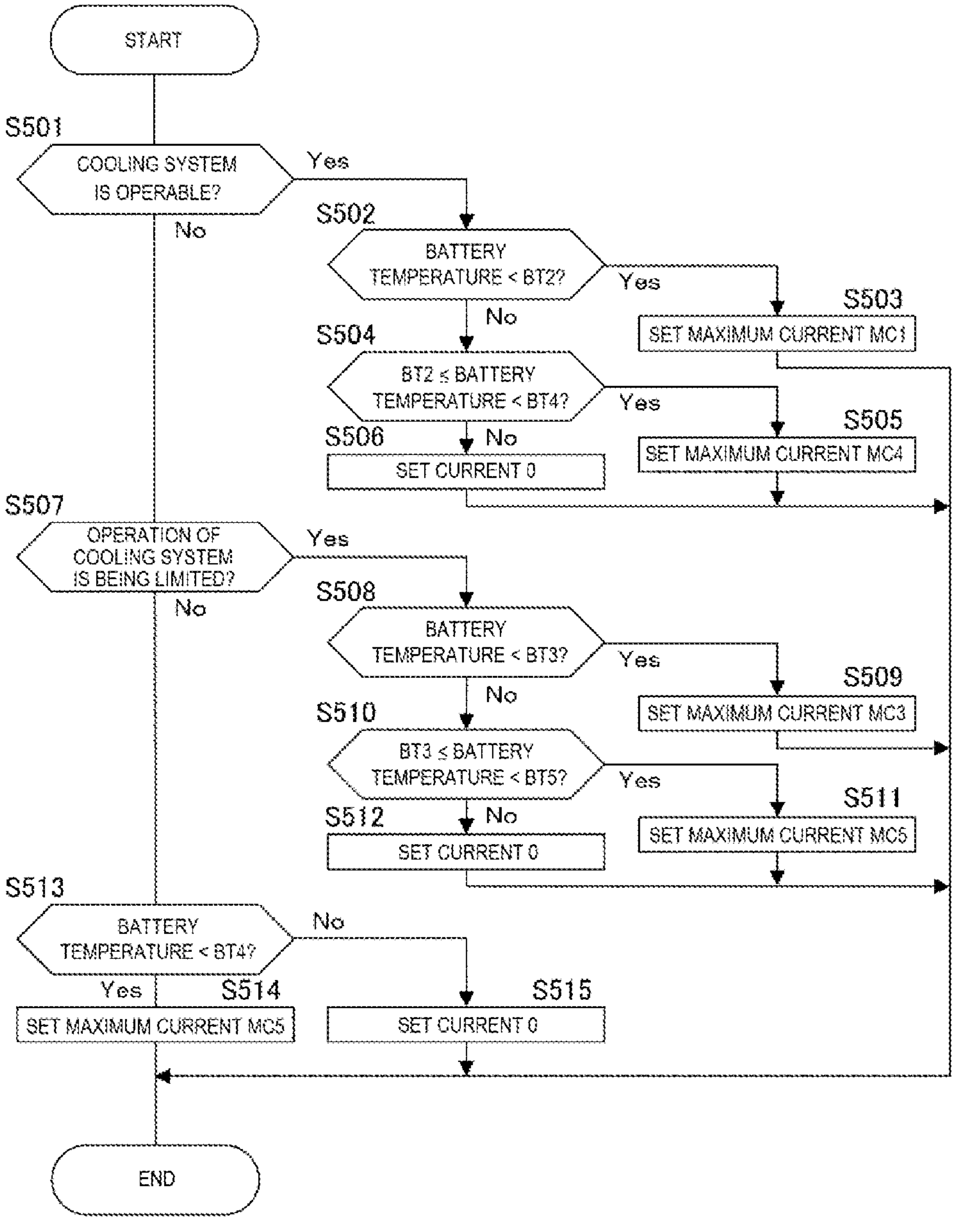
FIG. 12 is a flowchart illustrating an example of the procedure of the charging control process for the high-voltage battery performed by the VCM.

FIG. 12 is a flowchart illustrating an example of the procedure of the charging control process for the high-voltage battery 110 performed by the VCM 10. The procedure illustrated in FIG. 12 is an example obtained by modifying a part of the procedure illustrated in FIG. 5, and regarding a part common to the procedure illustrated in FIG. 5, a part of the description thereof is omitted.

In step S501, the VCM 10 determines whether the cooling system of the vehicle is operable. When the cooling system of the vehicle is operable, the procedure proceeds to step S502. On the other hand, when the entire cooling system of the vehicle is not in operation, the procedure proceeds to step S507.

Here, the cooling system of the vehicle is the AC 30. Under the control of the VCM 10, the AC 30 distributes and supplies the refrigerant to the vehicle interior for cooling and the parts other than the vehicle interior. The case where the cooling system of the vehicle is not operable means, for example, a case where the AC 30 fails or a case where the vehicle is present in an environment in which the cooling system cannot be operated. For example, in an environment of about −10 degrees, there is a possibility that the refrigerant is frozen and cannot be used, and thus the cooling system of the vehicle cannot be operated.

In addition, the case where the operation of the cooling system of the vehicle is limited means a case where the AC 30 is operable, but the supply of the refrigerant to the high-voltage battery 110 is limited for certain reasons. For example, when the vehicle interior becomes high in temperature and it is necessary to preferentially cool the vehicle interior, it is necessary to preferentially supply the refrigerant to the vehicle interior, and thus the supply of the refrigerant to the high-voltage battery 110 as the cooling system is limited. In an environment in which the outside air temperature is low and is below the freezing point, it is also assumed that a part of the AC 30 is not appropriately operated. In such a case, the supply of the refrigerant to the high-voltage battery 110 as the cooling system is limited.

Processes of steps S502 to S506 are the same as the processes of steps S222 to S226 illustrated in FIG. 5.

In this way, when the cooling system of the vehicle is operable, that is, in the case of the environment in which the high-voltage battery 110 is unlikely to become high in temperature, it is assumed that the high-voltage battery 110 is unlikely to generate heat as compared with a case where the cooling system of the vehicle is not operable, and the increase in the temperature of the high-voltage battery 110 is relatively slow. Therefore, when the temperature of the high-voltage battery 110 is lower than the BT2, the maximum charging current value is maintained or set to the charging current value MC1 corresponding to the above-described maximum charging electric power as in the example illustrated in FIG. 5. When the temperature of the high-voltage battery 110 is equal to or higher than the BT2 and is lower than the BT4, the relatively large value MC4 is set as the maximum charging current value to the high-voltage battery 110.

In step S507, the VCM 10 determines whether the operation of the cooling system of the vehicle is being limited. When the operation of the cooling system of the vehicle is being limited, the procedure proceeds to step S508. On the other hand, when the cooling system of the vehicle is not operable and the operation of the cooling system of the vehicle is not being limited, that is, when the cooling system of the vehicle is not operable, the procedure proceeds to step S513.

Processes of steps S508 to S512 are the same as the processes of steps S228 to S232 illustrated in FIG. 5.

In this way, when the operation of the cooling system of the vehicle is being limited, it is assumed that the high-voltage battery 110 is likely to generate heat as compared with the case where the entire cooling system of the vehicle is operable, and the increase in the temperature of the high-voltage battery 110 is relatively fast. Therefore, the relatively high values BT3 and BT5 are used as the determination references in steps S508 and S510. When the temperature of the high-voltage battery 110 is lower than the BT3, the relatively small value MC3 is set as the maximum charging current value to the high-voltage battery 110 as in FIG. 5. When the temperature of the high-voltage battery 110 is equal to or higher than the BT3 and is lower than the BT5, the relatively small value MC5 is set as the maximum charging current value to the high-voltage battery 110.

In step S513, the VCM 10 determines whether the temperature of the high-voltage battery 110 is lower than the BT4. When the temperature of the high-voltage battery 110 is lower than the BT4, the procedure proceeds to step S514. On the other hand, when the temperature of the high-voltage battery 110 is equal to or higher than the BT4, the procedure proceeds to step S515.

In step S514, the VCM 10 sets the MC5 as the maximum charging current value to the high-voltage battery 110.

In step S515, the VCM 10 sets the charging current value 0 of the high-voltage battery 110.

In this way, when the cooling system of the vehicle is not operable, it is assumed that the high-voltage battery 110 is more likely to generate heat, and the increase in the temperature of the high-voltage battery 110 is also fast. Therefore, the relatively low value BT4 is used as the determination reference in the process of step S513. Accordingly, the charging current value 0 of the high-voltage battery 110 can be set earlier. Therefore, for example, even in an environment in which the battery temperature increases due to the heat generation while the vehicle is traveling, it is possible to avoid the limitation during the traveling.

When it can be determined that an increasing rate of the battery temperature assumed in a state in which the cooling system of the vehicle is in operation is higher, a battery temperature lower than the initially assumed battery temperature may be set as the determination reference, or an amount of heat generation smaller than the initially assumed amount of heat generation may be controlled to be acquired.

[Modification of Charging Control in Consideration of Operation State of Cooling System]

FIG. 12 illustrates an example in which the maximum charging current value is set using two determination references for the battery temperature after the determination processes for the operation state of the cooling system. Alternatively, after the determination processes for the operation state of the cooling system, the maximum charging current value may be set using three or more determination references for the battery temperature. Therefore, FIG. 13 illustrates an example in which the maximum charging current value is set using three or more determination reference for the battery temperature after the determination process during operation limitation of the cooling system.

Figure 13:
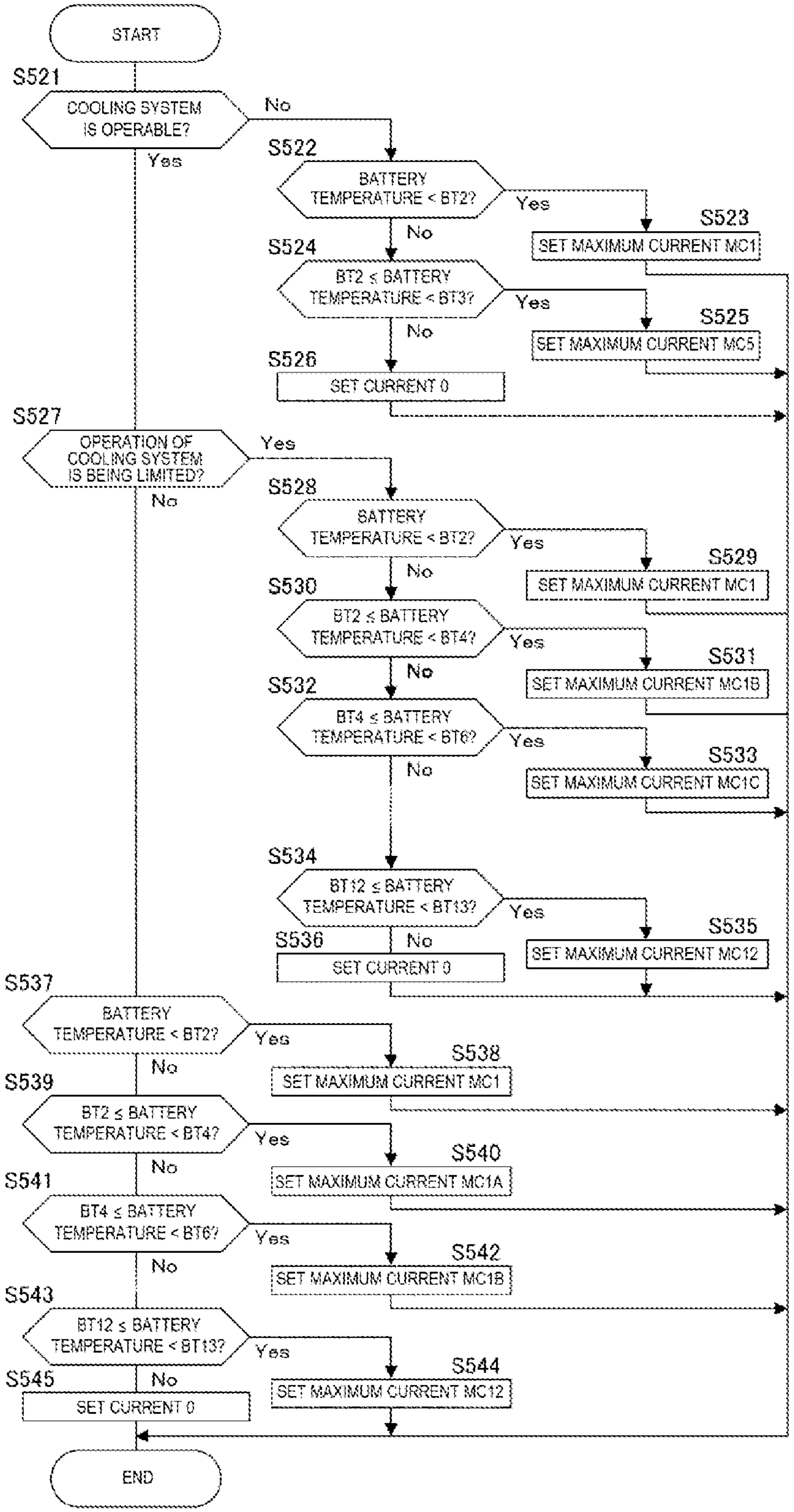
FIG. 13 is a flowchart illustrating an example of the procedure of the charging control process for the high-voltage battery performed by the VCM.

FIG. 13 is a flowchart illustrating an example of the procedure of the charging control process for the high-voltage battery 110 performed by the VCM 10. The procedure illustrated in FIG. 13 is an example obtained by modifying a part of the procedure illustrated in FIG. 12, and regarding a part common to the procedure illustrated in FIG. 12, a part of the description thereof is omitted.

Processes of steps S521 to S526 correspond to the processes of steps S501, S513 to S515 illustrated in FIG. 12. However, the processes are different in that the maximum charging current values (the MC1 and the MC5) are set using the two determination references for the battery temperature (the BT2 and the BT3).

Processes of steps S527 to S536 correspond to the processes of steps S507 to S512 illustrated in FIG. 12. However, the processes are different in that the maximum charging current values (the MC1, the MC1B, the MC1C, . . . , and the MC12) are set using the three or more determination references for the battery temperature (the BT2, the BT4, the BT6 . . . the BT12, and the BT13).

Processes of steps S537 to S545 correspond to the processes of steps S502 to S506 illustrated in FIG. 12. However, the processes are different in that the maximum charging current values (the MC1, the MC1A, the MC1B, . . . , and the MC12) are set by the three or more determination references for the battery temperature (the BT2, the BT4, the BT6, . . . , the BT12, and the BT13).

In this way, when the operation of the cooling system of the vehicle is being limited, it is assumed that the high-voltage battery 110 is more likely to generate heat, and the increase in the temperature of the high-voltage battery 110 is also fast. Therefore, the values MC1B and MC1C smaller than set values of steps S539 and S541 are used as set values of steps S530 and S532. Accordingly, the temperature of the high-voltage battery 110 can be early set low. Therefore, for example, even in an environment in which the battery temperature increases due to the heat generation while the vehicle is traveling, it is possible to avoid the limitation during the traveling.

[Modification of Charging Control in Consideration of Operation State of Cooling System]

FIGS. 12 and 13 illustrate examples in which a determination process of determining whether the operation of the cooling system is being limited is executed. However, the determination process of determining whether the operation of the cooling system is being limited may be omitted. Therefore, FIG. 14 illustrates an example in which the determination process of determining whether the operation of the cooling system is being limited is omitted.

Figure 14:
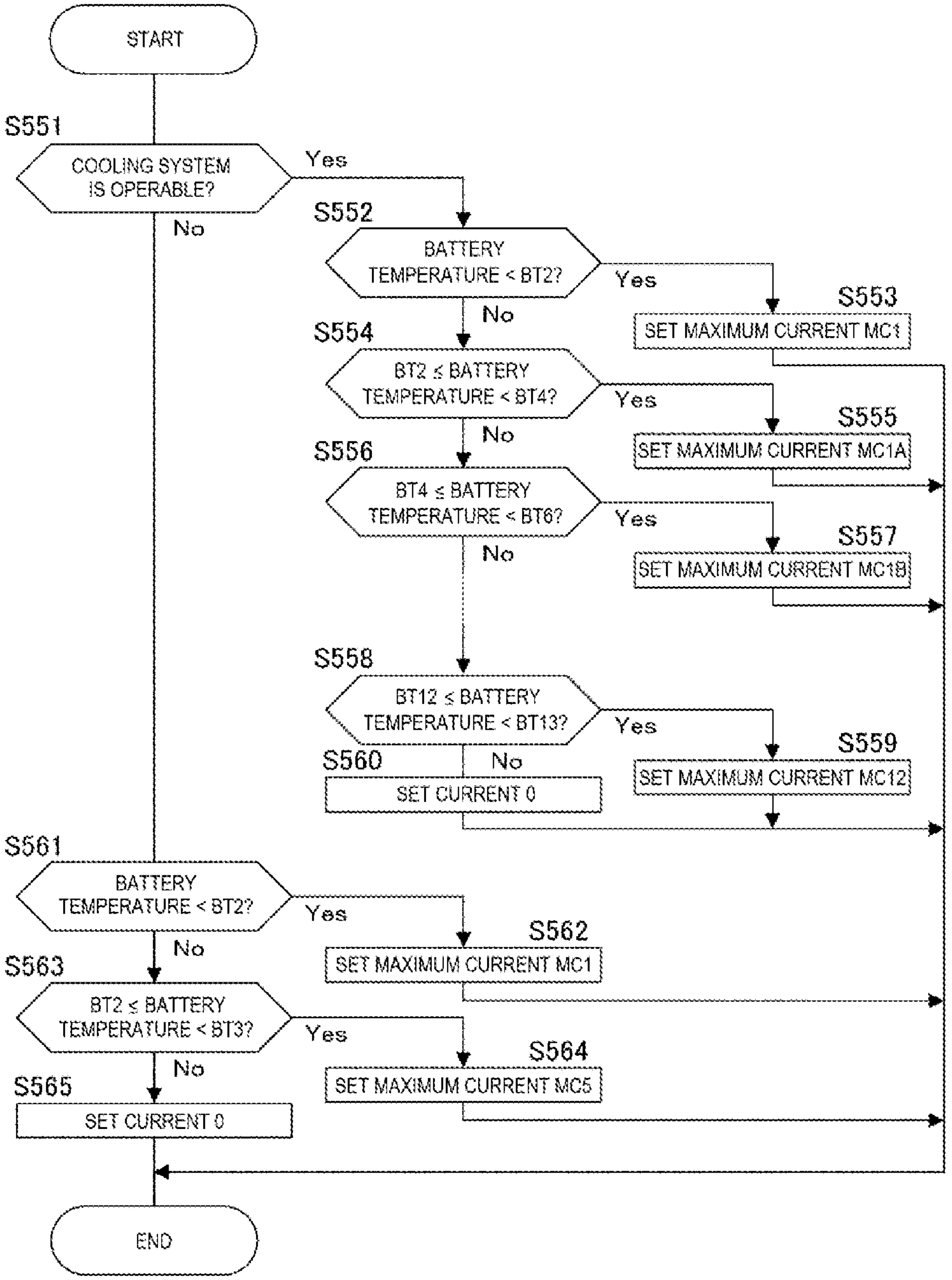
FIG. 14 is a flowchart illustrating an example of the procedure of the charging control process for the high-voltage battery performed by the VCM.

FIG. 14 is a flowchart illustrating an example of the procedure of the charging control process for the high-voltage battery 110 performed by the VCM 10. The procedure illustrated in FIG. 14 is an example obtained by modifying a part of the procedure illustrated in FIG. 12, and regarding a part common to the procedure illustrated in FIG. 12, a part of the description thereof is omitted.

Processes of steps S551 to S560 correspond to the processes of steps S501 to S506 illustrated in FIG. 12. However, the processes are different in that the maximum charging current values (the MC1, the MC1A, the MC1B . . . and the MC12) are set using the three or more determination references for the battery temperature (the BT2, the BT4, the BT6, . . . , the BT12, and the BT13).

Processes of steps S561 to S565 correspond to the processes of steps S513 to S515 illustrated in FIG. 12. However, the processes are different in that the maximum charging current values (the MC1 and the MC5) are set using the two determination references for the battery temperature (the BT2 and the BT3).

In this way, when the cooling system of the vehicle is not operable, it is assumed that the high-voltage battery 110 is more likely to generate heat, and the increase in the temperature of the high-voltage battery 110 is also fast. Therefore, the determination process of determining whether the operation of the cooling system is being limited is omitted, and the determination references for the battery temperature when the cooling system of the vehicle is not operable are set to relatively low values (the BT2 and the BT3). Accordingly, the temperature of the high-voltage battery 110 can be early set low. Therefore, for example, even in an environment in which the battery temperature increases due to the heat generation while the vehicle is traveling, it is possible to avoid the limitation during the traveling.

[Another Charging Control Example Using Information on Heat]

FIGS. 4 to 14 illustrate examples in which the charging current value is controlled using the temperature of the high-voltage battery 110, the SOH of the high-voltage battery 110, the outside air temperature, and the operation state of the cooling system of the vehicle as information on heat of the high-voltage battery 110. However, it is also possible to control the charging current value using other information as the information on the heat of the high-voltage battery 110. Therefore, FIGS. 15 and 16 illustrate examples in which the charging current value is controlled using the other information.

[Charging Control Example Using Amount of Heat Generation]

Figure 15:
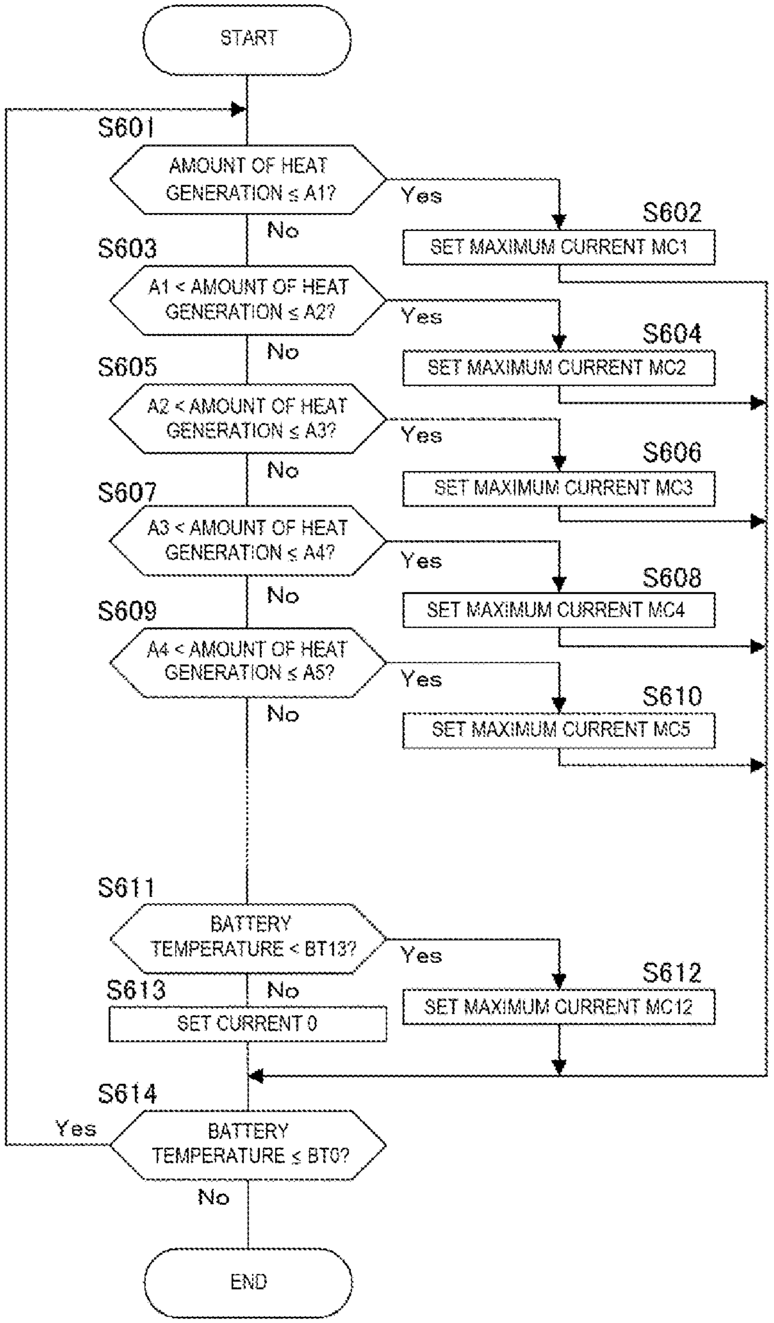
FIG. 15 is a flowchart illustrating an example of the procedure of the charging control process for the high-voltage battery performed by the VCM.
Figure 16:
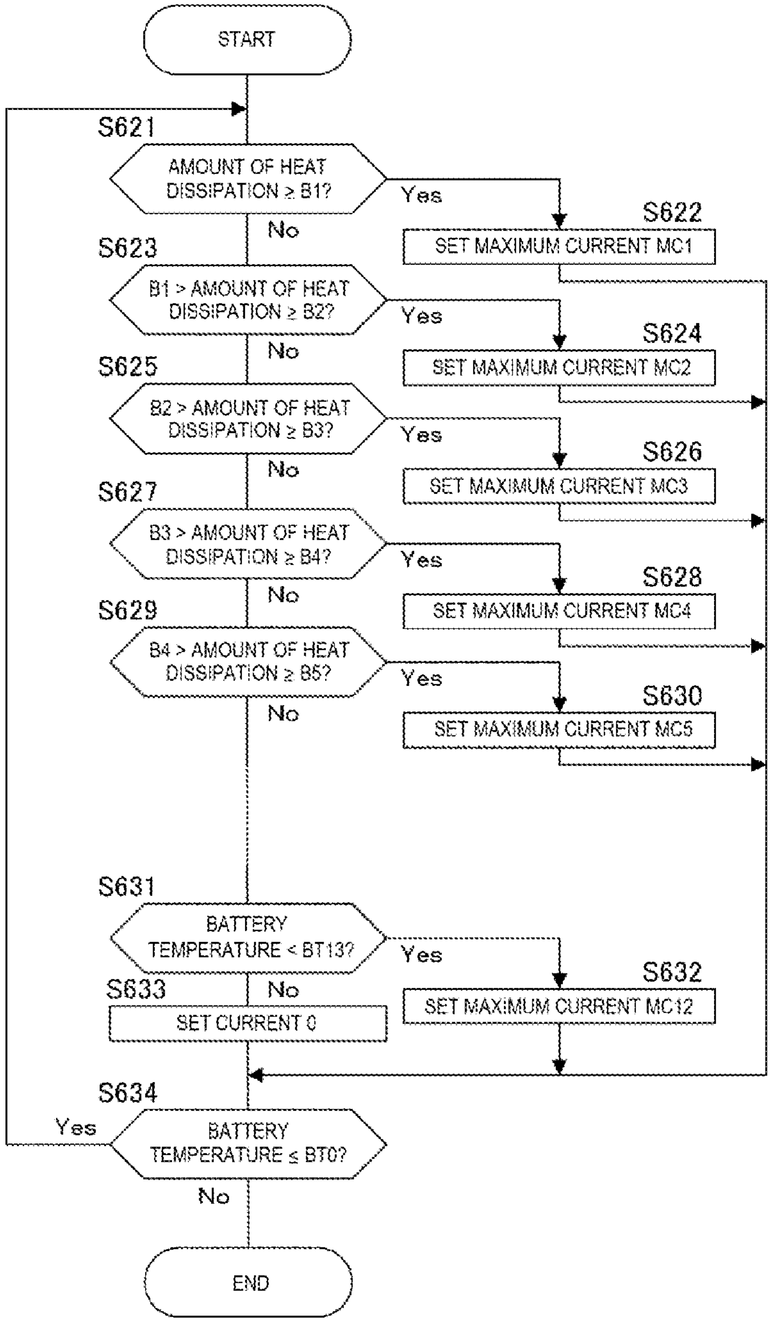
FIG. 16 is a flowchart illustrating an example of the procedure of the charging control process for the high-voltage battery performed by the VCM.

FIG. 15 illustrates an example in which the charging current value is controlled using the amount of heat generation by the high-voltage battery 110 as the information on the heat of the high-voltage battery 110.

FIG. 15 is a flowchart illustrating an example of the procedure of the charging control process for the high-voltage battery 110 performed by the VCM 10. The procedure illustrated in FIG. 15 is an example obtained by modifying a part of the procedure illustrated in FIG. 4, and regarding a part common to the procedure illustrated in FIG. 4, a part of the description thereof is omitted. Specifically, steps S602, S604, S606, S608, S610, S611 to S614 illustrated in FIG. 15 correspond to steps S202, S204, S206, S208, S210, S211 to S214 illustrated in FIG. 4, and thus the description thereof is omitted.

Threshold values A1 to A5 illustrated in FIG. 15 are reference values to be used when setting the maximum charging current value. For example, the A1 is a value of about 400 (J), the A2 is a value of about 800 (J), the A3 is a value of about 1200 (J), the A4 is a value of about 1500 (J), and the A5 is a value of about 2000 (J).

In step S601, the VCM 10 determines whether the amount of heat generation by the high-voltage battery 110 is equal to or less than the A1. The amount of heat generation [W] by the high-voltage battery 110 can be obtained by using the following equation.

$$\text{Amount of Heat Generation}[W]=\text{Internal Resistance }[\Omega]\text{ of High-voltage Battery }110\times\text{Current}[I]^2$$

When the amount of heat generation by the high-voltage battery 110 is equal to or less than the A1, the procedure proceeds to step S602. On the other hand, when the amount of heat generation by the high-voltage battery 110 is larger than the A1, the procedure proceeds to step S203.

In step S603, the VCM 10 determines whether the amount of heat generation by the high-voltage battery 110 is larger than the A1 and is equal to or less than the A2. When the amount of heat generation by the high-voltage battery 110 is larger than the A1 and is equal to or less than the A2, the procedure proceeds to step S604. On the other hand, when the amount of heat generation by the high-voltage battery 110 is larger than the A2, the procedure proceeds to step S605.

In step S605, the VCM 10 determines whether the amount of heat generation by the high-voltage battery 110 is larger than the A2 and is equal to or less than the A3. When the amount of heat generation by the high-voltage battery 110 is larger than the A2 and is equal to or less than the A3, the procedure proceeds to step S606. On the other hand, when the amount of heat generation by the high-voltage battery 110 is larger than the A3, the procedure proceeds to step S607.

In step S607, the VCM 10 determines whether the amount of heat generation by the high-voltage battery 110 is larger than the A3 and is equal to or less than the A4. When the amount of heat generation by the high-voltage battery 110 is larger than the A3 and is equal to or less than the A4, the procedure proceeds to step S608. On the other hand, when the amount of heat generation by the high-voltage battery 110 is larger than the A4, the procedure proceeds to step S609.

In step S609, the VCM 10 determines whether the amount of heat generation by the high-voltage battery 110 is larger than the A4 and is equal to or less than the A5. When the amount of heat generation by the high-voltage battery 110 is larger than the A4 and is equal to or less than the A5, the procedure proceeds to step S610.

In step S609, when the amount of heat generation by the high-voltage battery 110 is larger than the A5, a process based on an example of an relation between the amount of heat generation by the high-voltage battery 110 and the maximum charging current value is repeatedly performed as in the processes illustrated in steps S601 to S610, although not illustrated.

In step S614, instead of determining whether the temperature of the high-voltage battery 110 is equal to or lower than the predetermined value BT0, it may be determined whether the amount of heat generation by the high-voltage battery 110 is equal to or less than a predetermined value A0. For example, a value smaller than the A1 can be used as the predetermined value A0 to be used in this case. For example, a value obtained by subtracting a value corresponding to the hysteresis portion from the A1 can be set as the predetermined value A0.

In this way, in the example illustrated in FIG. 15, it is possible to set an appropriate charging current value according to the amount of heat generation by the high-voltage battery 110. As illustrated in FIGS. 5 to 14, the charging current value according to the temperature of the high-voltage battery 110 can be set to a current value that can be adapted to various conditions, for example, the SOH, the outside air temperature, and the operation state of the cooling system of the vehicle. In this way, according to the present embodiment, it is possible to set an appropriate charging current limitation according to the various conditions.

In addition, in the example illustrated in FIG. 15, since a process based on the example of the relation between the amount of heat generation by the high-voltage battery 110 and the maximum charging current value is performed, the processing load on the VCM 10 can be reduced, and the control implementation can be facilitated. [Charging Control Example Using Amount of Heat Dissipation]

FIG. 15 illustrates the example in which the charging current value is controlled using the amount of heat generation by the high-voltage battery 110 as the information on the heat of the high-voltage battery 110. Here, when the amount of heat dissipation from the high-voltage battery 110 is larger than the amount of heat generation, the temperature of the high-voltage battery 110 increases. Therefore, it becomes important to calculate how to reduce the amount of heat generation by the high-voltage battery 110, and appropriately control the amount of heat generation. Therefore, FIG. 16 illustrates an example in which the charging current value is controlled using the amount of heat dissipation from the high-voltage battery 110 as the information on the heat of the high-voltage battery 110.

FIG. 16 is a flowchart illustrating an example of the procedure of the charging control process for the high-voltage battery 110 performed by the VCM 10. The procedure illustrated in FIG. 16 is an example obtained by modifying a part of the procedure illustrated in FIG. 15, and regarding a part common to the procedure illustrated in FIG. 15, a part of the description thereof is omitted.

Specifically, in the determination processes of steps S601, S603, S605, S607, and S609 illustrated in FIG. 15, the determination is performed using the amount of heat generation, whereas the determination processes of steps S621, S623, S625, S627, and S629 illustrated in FIG. 16 are different in that the determination is performed using the amount of heat dissipation.

The amount of heat dissipation [W] from the high-voltage battery 110 can be obtained based on a relation between the temperature of the high-voltage battery 110 and a temperature of the refrigerant supplied from the AC For example, the amount of heat dissipation [W] from the high-voltage battery 110 can be obtained by using the following equation.

Amount of Heat Dissipation[*W*]=(Temperature[° C.] of High-voltage Battery 110−Temperature[° C.] of Refrigerant)/Thermal Resistance[K/W] of High-voltage Battery 110

For example, when the temperature of the high-voltage battery 110 is 55° C. and the temperature of the refrigerant is 5° C., the temperature [° C.] of the high-voltage battery 110−the temperature [° C.] of the refrigerant=50° C. In this case, when the thermal resistance of the high-voltage battery 110 is K/W, the amount of heat dissipation [W] is 1000 W. For example, when the amount of heat generation by the high-voltage battery 110 is 1562.5 W and the amount of heat dissipation is 1000 W, the temperature of the high-voltage battery 110 increases by a heat amount of 562.5 W. In this way, when the battery temperature increases, a value obtained by "the temperature [° C.] of the high-voltage battery 110−the temperature [° C.] of the refrigerant" increases accordingly, and the amount of heat dissipation also increases. In this case, the battery temperature increases to a value at which the amount of heat dissipation and the amount of heat generation are balanced.

Threshold values B1 to B5 illustrated in FIG. 16 are reference values to be used when setting the maximum charging current value. For example, the B1 is a value of about 2000 (J), the B2 is a value of about 1500 (J), the B3 is a value of about 1200 (J), the B4 is a value of about 800 (J), and the B5 is a value of about 400 (J).

In step S629, when the amount of heat generation by the high-voltage battery 110 is smaller than the B5, a process based on an example of a relation between the amount of heat dissipation from the high-voltage battery 110 and the maximum charging current value is repeatedly performed as in the processes illustrated in steps S621 to S630, although not illustrated.

In step S634, instead of determining whether the temperature of the high-voltage battery 110 is equal to or lower than the predetermined value BT0, it may be determined whether the amount of heat dissipation from the high-voltage battery 110 is equal to or larger than a predetermined value B0. For example, a value larger than the B1 can be used as the predetermined value B0 to be used in this case. For example, a value obtained by adding a value corresponding to the hysteresis portion to the B1 can be set as the predetermined value B0.

In this way, in the example illustrated in FIG. 16, it is possible to set an appropriate charging current value according to the amount of heat dissipation from the high-voltage battery 110. As illustrated in FIGS. 5 to 14, the charging current value according to the temperature of the high-voltage battery 110 can be set to a current value that can be adapted to various conditions, for example, the SOH, the outside air temperature, and the operation state of the cooling system of the vehicle. In this way, according to the present embodiment, it is possible to set an appropriate charging current limitation according to the various conditions.

In addition, in the example illustrated in FIG. 16, since the process based on the example of the relation between the amount of heat dissipation from the high-voltage battery 110 and the maximum charging current value is performed, the processing load on the VCM 10 can be reduced, and the control implementation can be facilitated.

The determination references and the maximum charging current values illustrated in FIGS. 4 to 16 can be appropriately changed, and the conditions illustrated in FIGS. 4 to 16 can also be used in combination. In this case, for example, when different conditions for setting the maximum charging current value are satisfied at the same time, it is preferable to set a maximum charging current value corresponding to a condition with a severest limitation among the maximum charging current values corresponding to the satisfied conditions.

In addition, in the example illustrated in FIG. 15, an example in which the amount of heat generation is used as the determination reference is illustrated. Since the amount of heat generation can be obtained based on a relation between the internal resistance of the high-voltage battery 110 and the current, the example illustrated in FIG. 15 can also be understood as an example in which the current is used as the determination reference. In addition, if the electric power and the voltage during the charging are known, the current during the charging can also be obtained. Therefore, the example illustrated in FIG. 15 can also be understood as an example in which the voltage, for example, the total voltage or a cell voltage are used as the determination reference.

In this way, in the present embodiment, it is possible to simply control the charging current value to keep a predetermined battery temperature range (for example, the n-th threshold value temperature to the travel output limiting temperature) instead of the control of stopping the charging when the battery temperature exceeds the threshold value temperature and restarting the charging when the battery temperature is lower than the threshold value temperature. However, in the present embodiment, when the battery temperature is equal to or higher than the predetermined temperature, the supply of electric power is prohibited and the charging is stopped. For example, when the battery temperature decreases, when the amount of heat generation by the secondary battery decreases, or when a cooling performance is improved, the charging can be performed by restarting an energizing current.

As described above, according to the present embodiment, in the low-temperature region where the battery temperature is low, the charging current can be set to the charging current value MC1 corresponding to the rated charging electric power determined in accordance with the design of the external charger or the like, and high charging electric power can be secured. On the other hand, when the battery temperature increases, a maximum charging current is limited to control the amount of heat generation by the secondary battery and the battery temperature to the predetermined values. Accordingly, it is possible to limit an excessive increase in the battery temperature at the end of the charging, and to increase a distance by which the vehicle can travel without a discharging electric power limitation.

That is, when a real-time electric power limitation is performed when the battery temperature becomes high, since the current value is not constant during the charging, the amount of heat generation cannot be controlled to be constant, and the amount of heat generation by the high-voltage battery 110 cannot be appropriately controlled. On the other hand, by performing the real-time current limitation when the battery temperature becomes high, the current value during the charging can be made constant, and the amount of heat generation can be controlled to be constant. In this way, the high-voltage battery 110 can be appropriately charged by appropriately controlling the amount of heat generation by the high-voltage battery 110, and the distance by which the vehicle can travel can be increased.

In this way, the VCM 10 acquires the temperature, the current, the total voltage, the cell voltage, the state of charge, the deteriorating state, and the cooling state of the high-voltage battery 110. Further, the VCM 10 controls the energizing current at the time of charging the high-voltage battery 110 based on the temperature, the current, the total voltage, the cell voltage, the state of charge, and the deteriorating state. In this case, the VCM 10 controls the charging current value to a predetermined value, controls the battery temperature to a predetermined value, and controls the amount of heat generation by the high-voltage battery 110 to a predetermined value. In addition, the VCM 10 controls the charging electric power to be variable in order to control the charging current value to the predetermined value. When the battery temperature exceeds the predetermined value, the VCM 10 further controls to change the current value and the amount of heat generation.

In addition, the VCM 10 controls the amount of the heat generation by the high-voltage battery 110 to the predetermined value based on at least one of the temperature, the current, the total voltage, the cell voltage, the state of charge, and the cooling state of the high-voltage battery 110, or a plurality of conditions thereof. In this case, the VCM 10 can control the amount of the heat generation by the high-voltage battery 110 to the predetermined value by using the constant map set in advance (see FIG. 3B) in order to control the amount of heat generation or the battery temperature to the predetermined value.

In addition, in accordance with a difference in the cooling performance due to an operation state of the cooling system for the high-voltage battery 110, the VCM 10 controls the charging current value to the predetermined value based on at least one of the temperature, the current, the total voltage, the cell voltage, and the state of charge of the high-voltage battery 110, or a plurality of conditions thereof. In this case, the VCM 10 can change the predetermined temperature, which is a target temperature, in accordance with a difference in a heat generation condition of the high-voltage battery 110, such as the deterioration of the high-voltage battery 110 and the operation state of the cooling system of the high-voltage battery 110, and can control the temperature of the high-voltage battery 110 to the predetermined value by using the constant map set in advance (see FIG. 3B). Accordingly, the battery temperature can be controlled to the predetermined value, and the amount of heat generation by the high-voltage battery 110 can be controlled to the predetermined value.

The difference in the cooling performance of the cooling system for the high-voltage battery 110 occurs due to the temperature of the external environment or a difference in the amount of heat dissipation from the high-voltage battery 110. Therefore, the VCM 10 controls the charging current value to the predetermined value based on the operation state of the cooling system for the high-voltage battery 110, the temperature of the external environment, and the like. Accordingly, the battery temperature can be controlled to the predetermined value, and the amount of heat generation by the high-voltage battery 110 can be controlled to the predetermined value.

Configuration and Effects of Present Embodiment

The charging control method for a secondary battery according to the present embodiment is a charging control method for controlling the charging of the high-voltage battery 110 (an example of the secondary battery). The charging control method includes an acquisition step of acquiring information on the heat of the high-voltage battery 110, and a control step of setting, based on the information on the heat of the high-voltage battery 110, the charging current value of the high-voltage battery 110 to control the amount of heat generation by the high-voltage battery 110 to the predetermined value (the processes illustrated in FIGS. 4 to 16).

According to the charging control method, it is possible to set an appropriate charging current value in consideration of the amount of heat generation by the high-voltage battery 110, and it is possible to limit the increase in the temperature of the high-voltage battery 110 during the charging. Accordingly, it is possible to continuously execute the charging while limiting the increase in the temperature of the high-voltage battery 110. In the charging control method for a secondary battery according to the present embodiment, in the control step, the charging electric power of the high-voltage battery 110 is set variable so that the charging current value of the high-voltage battery 110 is constant.

According to the charging control method, a specific control configuration for adjusting the amount of heat generation by the high-voltage battery 110 to be constant is achieved. More specifically, the charging current value directly related to the amount of heat generation by the high-voltage battery 110 is set to a constant value. In particular, by setting the constant values (the MC1, the MC2, . . . , the MC12) for at least the BT1 to the BT2, the BT2 to the BT3, . . . , and the BT12 to the BT13, which are temperature regions, it is possible to achieve a preferable control configuration capable of executing the charging while limiting a variation in the amount of heat generation.

In the charging control method for a secondary battery according to the present embodiment, in the acquisition step, the information on the heat of the high-voltage battery 110 is acquired at a predetermined timing. For example, as described with reference to FIG. 4, the VCM 10 acquires various kinds of information (an example of the information on the heat of the high-voltage battery 110) to be used for the charging control at the predetermined timing. The predetermined timing can be set as, for example, a start timing of the procedure to be repeatedly executed at a predetermined interval (the procedures illustrated in FIGS. 4 to 16) after the charging of the high-voltage battery 110 is started. Other periodic or irregular timings may be set as the predetermined timing. In addition, in the control step, when a predetermined change in the information on the heat of the high-voltage battery 110 is detected, the charging current value of the high-voltage battery 110 is changed based on the change. Here, the predetermined change is detected, for example, in the determination processes illustrated in FIGS. 4 to 16. For example, in the example illustrated in FIG. 4, when the battery temperature lower than the BT2 is equal to or higher than the BT2 (No in step S201), it is detected that a predetermined change in the battery temperature (an example of the information on the heat of the high-voltage battery 110) occurred. In this case, the charging current value of the high-voltage battery 110 is changed based on the change. For example, when the battery temperature is equal to or higher than the BT2 and is lower than the BT3, the charging current value of the high-voltage battery 110 is changed from the MC2 to the MC3.

According to the charging control method, when the predetermined change in the information on the heat of the high-voltage battery 110 occurs, the charging current value is changed based on the change, and thus the charging current value can be set quickly in consideration of the amount of heat generation by the high-voltage battery 110.

In the charging control method for a secondary battery according to the present embodiment, the information on the heat of the high-voltage battery 110 can be at least one of the temperature of the high-voltage battery 110, the amount of heat generation by the high-voltage battery 110, and the amount of heat dissipation from the high-voltage battery 110.

According to the charging control method, the information on the heat of the high-voltage battery 110 can be quantified by a parameter that can be detected or calculated relatively easily, such as the temperature of the high-voltage battery 110, the amount of heat generation by the high-voltage battery 110, and the amount of heat dissipation from the high-voltage battery 110. Therefore, a preferable control configuration for appropriately setting the charging current value in consideration of the heat generation by the high-voltage battery 110 is achieved.

In the charging control method for a secondary battery according to the present embodiment, the information on the heat of the high-voltage battery 110 can include the external environment of the high-voltage battery 110 or the deteriorating state of the high-voltage battery 110. In the control step (the processes illustrated in FIGS. 5 to 14), the charging current value of the high-voltage battery 110 is set using the external environment of the high-voltage battery 110 or the deteriorating state of the high-voltage battery 110 together with at least one of the temperature of the high-voltage battery 110, the amount of heat generation by the high-voltage battery 110, and the amount of heat dissipation from the high-voltage battery 110.

According to the charging control method, it is possible to set an appropriate charging current value in consideration of the amount of heat generation by the high-voltage battery 110 using the external environment of the high-voltage battery 110 or the deteriorating state of the high-voltage battery 110.

In the charging control method for a secondary battery according to the present embodiment, in the control step, the determination reference for setting the charging current value of the high-voltage battery 110 is changed based on the external environment of the high-voltage battery 110 or the deteriorating state of the high-voltage battery 110.

According to the charging control method, since the determination reference for setting the charging current value of the high-voltage battery 110 is changed based on the external environment of the high-voltage battery 110 or the like, it is possible to set an appropriate charging current value in consideration of the amount of heat generation by the high-voltage battery 110.

In the charging control method for a secondary battery according to the present embodiment, the external environment of the high-voltage battery 110 can be set to the external temperature of the high-voltage battery 110, or the operation state of the cooling system for the high-voltage battery 110.

According to the charging control method, it is possible to set an appropriate charging current value in consideration of the amount of heat generation by the high-voltage battery 110 based on the external temperature of the high-voltage battery 110 or the operation state of the cooling system for the high-voltage battery 110.

The control system for secondary battery 1 according to the present embodiment (an example of a charging control system for a secondary battery) is a charging control system that includes the high-voltage battery 110 (an example of the secondary battery) and the VCM 10 that controls the charging of the high-voltage battery 110 (an example of the controller). The VCM 10 acquires the information on the heat of the high-voltage battery 110, and sets, based on the information on the heat of the high-voltage battery 110, the charging current value of the high-voltage battery 110 to control the amount of the heat generation by the high-voltage battery 110 to the predetermined value.

According to the control system for secondary battery 1, it is possible to set an appropriate charging current value in consideration of the amount of heat generation by the high-voltage battery 110, and it is possible to limit the increase in the temperature of the high-voltage battery 110 during the charging. Accordingly, it is possible to continuously execute the charging while limiting the increase in the temperature of the high-voltage battery 110.

It should be noted that each process described in the present embodiment is executed based on a program that causes a computer to execute each procedure. Therefore, the present embodiment can be understood as an embodiment of a program that implements a function of executing each process and a recording medium that stores the program. For example, the program can be stored in a storage device of the vehicle by an update operation for adding a new function to the vehicle. Accordingly, each process described in the present embodiment can be executed on the updated vehicle. The update may be performed, for example, at the time of a periodic inspection of the vehicle. Alternatively, the program may also be updated by wireless communication.

Although the embodiment of the present invention is described above, the embodiment merely exemplifies a part of application examples of the present invention and does not intend to limit the technical scope of the present invention to the specific configurations of the embodiment.

The invention claimed is:

1. A charging control method for controlling charging of a secondary battery, the method comprising:

an acquisition step of acquiring an operation state of a cooling system for the secondary battery and at least one of a temperature of the secondary battery, an amount of heat generation by the secondary battery, and an amount of heat dissipation from the secondary battery as information on heat of the secondary battery; and a control step of setting, based on a change in the information on the heat, a charging current value of the secondary battery to control the amount of heat generation by the secondary battery to a predetermined value, wherein in the control step, when the charging current value of the secondary battery is decreased in accordance with a change in the acquired temperature, the acquired amount of heat generation or the acquired amount of heat dissipation of the secondary battery, a set value of the charging current value when a supply of refrigerant to the secondary battery is limited during an operation of the cooling system is set relatively smaller than a set value of the charging current value when the supply of refrigerant is not limited.

2. The charging control method according to claim 1, wherein in the control step, when the charging current value of the secondary battery is decreased in accordance with the change in the acquired temperature, the acquired amount of heat generation or the acquired amount of heat dissipation of the secondary battery, a change rate of the charging current value is decreased in accordance with a decrease in the charging current value, when the charging current value of the secondary battery is increased in accordance with the change, the change rate of the charging current value is increased in accordance with an increase of the charging current value within a range in which the charging current value does not exceed a maximum charging current value.

3. The charging control method according to claim 1, wherein in the control step, charging electric power is set variable so that the charging current value is constant.

4. The charging control method according to claim 1, wherein in the acquisition step, the information on the heat is acquired at a predetermined timing, and in the control step, when a predetermined change in the information on the heat is detected, the charging current value is changed based on the change.

5. The charging control method according to claim 1, wherein the information on the heat includes an external temperature of the secondary battery or a deterioration state of the secondary battery, and in the control step, the charging current value is set using the external temperature of the secondary battery or the deterioration state of the secondary battery.

6. The charging control method according to claim 5, wherein in the control step, a determination reference for setting the charging current value based on the external temperature of the secondary battery or the deterioration state of the secondary battery is changed.

7. A charging control system comprising:

a secondary battery; and a controller configured to control charging of the secondary battery, wherein the controller acquires an operation state of a cooling system for the secondary battery and at least one of a temperature of the secondary battery, an amount of heat generation by the secondary battery, and an amount of heat dissipation from the secondary battery as information on heat of the secondary battery, the controller executes a control process of setting, based on a change in the acquired information on the heat, a charging current value of the secondary battery to control the amount of heat generation by the secondary battery to a predetermined value, and in the control process, when the charging current value of the secondary battery is decreased in accordance with a change in the acquired temperature, the acquired amount of heat generation or the acquired amount of heat dissipation of the secondary battery, a set value of the charging current value when a supply of refrigerant to the secondary battery is limited during an operation of the cooling system is set relatively smaller than a set value of the charging current value when the supply of refrigerant is not limited.

* * * * *